United States Patent
Kimura

(10) Patent No.: US 8,374,412 B2
(45) Date of Patent: Feb. 12, 2013

(54) DATA PROCESSING APPARATUS, MEDICAL DIAGNOSTIC APPARATUS, DATA PROCESSING METHOD AND MEDICAL DIAGNOSTIC METHOD

(75) Inventor: Tokunori Kimura, Yaita (JP)

(73) Assignees: Kabushiki Kaisha Toshiba, Minato-ku, Tokyo (JP); Toshiba Medical Systems Corporation, Otawara-shi, Tochigi-ken (JP)

( * ) Notice: Subject to any disclaimer, the term of this patent is extended or adjusted under 35 U.S.C. 154(b) by 1167 days.

(21) Appl. No.: 12/155,461

(22) Filed: Jun. 4, 2008

(65) Prior Publication Data

US 2008/0304731 A1    Dec. 11, 2008

(30) Foreign Application Priority Data

Jun. 7, 2007  (JP) ................. 2007-151392
Mar. 26, 2008  (JP) ................. 2008-079660

(51) Int. Cl.
*G06K 9/00* (2006.01)
(52) U.S. Cl. .......................... 382/131; 378/4
(58) Field of Classification Search ............. 378/4, 19, 378/62; 382/128, 130–131
See application file for complete search history.

(56) References Cited

U.S. PATENT DOCUMENTS

| 6,423,003 | B1 | 7/2002 | Ustuner et al. | |
| 2003/0076988 | A1* | 4/2003 | Liang et al. | 382/131 |
| 2007/0198203 | A1 | 8/2007 | Kimura | |

FOREIGN PATENT DOCUMENTS

| WO | 02/01855 A2 | 1/2002 |
| WO | 2005/024724 A2 | 3/2005 |
| WO | 2006/082590 A2 | 8/2006 |

OTHER PUBLICATIONS

Extended European Search Report dated Jul. 8, 2010 in EP 08 01 0362.5.
Yan J.C.K. et al., "Film grain noise removal and generation for color images," Acoustics, Speech and Signal Processing, 1998. Proceedings of the 1998 IEEE International Conference on Seattle, WA, USA May 12-15, 1998, New York, Ny, USA, IEEE, US, DOI: 10.1109/ICASSP. 1998.678146, vol. 5, May 12, 1998, pp. 2957-2960, XP010279377.

* cited by examiner

*Primary Examiner* — Hoon Song
(74) *Attorney, Agent, or Firm* — Nixon & Vanderhye PC

(57) ABSTRACT

A data processing apparatus includes a SNR distribution data generating unit, a filter processing unit, a weighting function generating unit and a corrected data generating unit. The SNR distribution data generating unit generates SNR distribution data of processing target data based on the processing target data. The filter processing unit generates filter processed data obtained by performing filter processing to the processing target data to improve a SNR of the processing target data. The weighting function generating unit generates a weighting function based on the SNR distribution data. The corrected data generating unit generates corrected data by performing weighted calculation between the processing target data and the filter processed data using the weighting function.

24 Claims, 12 Drawing Sheets (a) SECTION OF AN OBJECT (b) MR SIGNAL INTENSITY (SNR DISTRIBUTION)

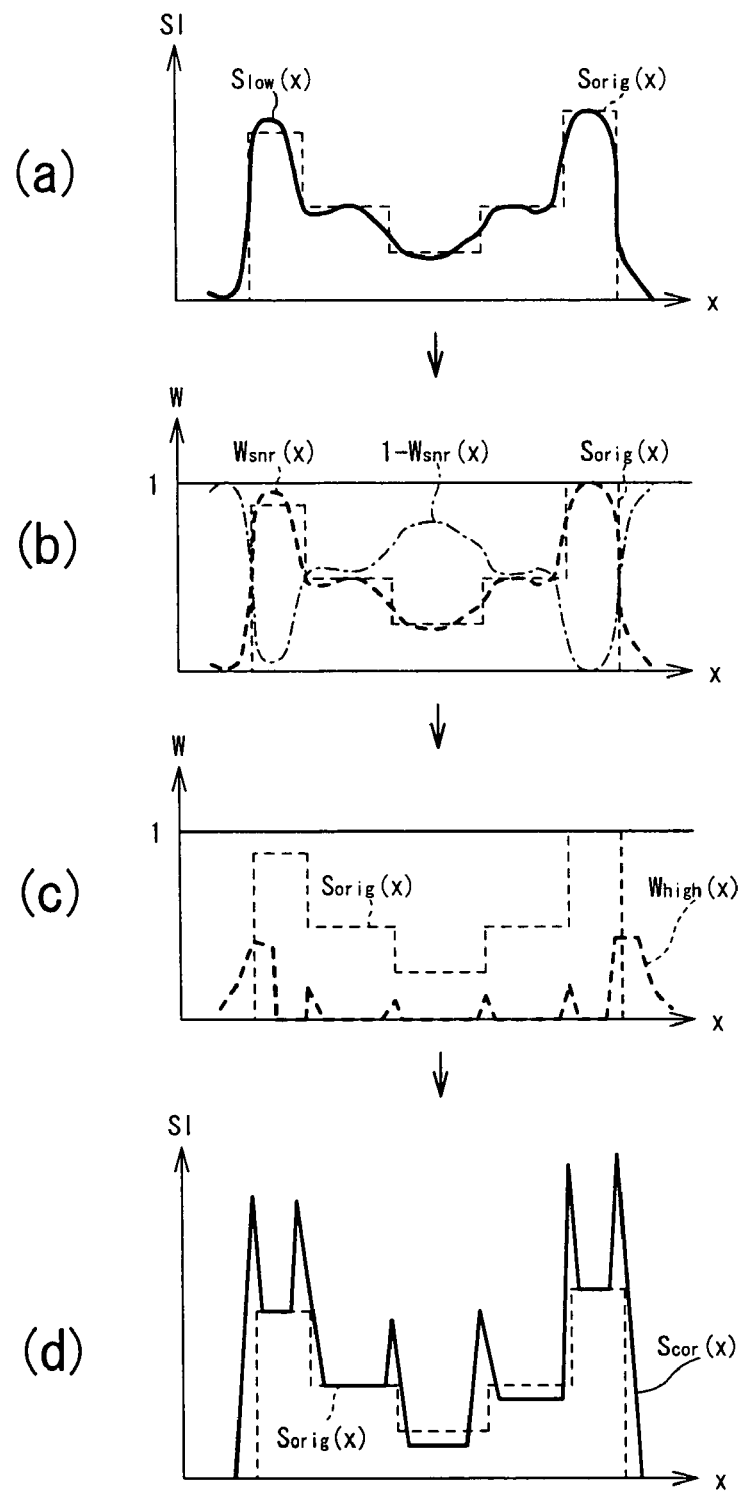
F I G. 7

DATA PROCESSING APPARATUS, MEDICAL DIAGNOSTIC APPARATUS, DATA PROCESSING METHOD AND MEDICAL DIAGNOSTIC METHOD

BACKGROUND

1. Technical Field

The present exemplary embodiment relates to a data processing apparatus, a medical diagnostic apparatus, a data processing method and a medical diagnostic method which improve SNR (signal to noise ratio) by reducing noise of time axis and/or spatial axis data having random noise, and more particularly, to a data processing apparatus, a medical diagnostic apparatus, a data processing method and a medical diagnostic method which correct the data adaptively to SNR so as to reduce noise selectively while yet keeping data of a high frequency part and/or a high SNR part.

2. Description of the Related Art

Conventionally, filtering is performed for reducing random noise in data having space axes and a temporal axis. Filters for reducing noise include an adaptive filter of which filter strength is determined according to data in addition to a linear filter of which filter strength does not change temporally and spatially. A structure adaptive filter and SNR adaptive filter are proposed as an adaptive filter to reduce random noise spatially and temporally.

The structure adaptive filter is a filter of which filter strength is determined according to structure of data to maintain a local structure of a high-frequency component such as an edge, a line, or a point. A type which detects directions of an edge and a line and controls a direction of filtering according to the detected directions of an edge and a line, and a type which controls a filter strength are included in structure adaptive filters.

For example, a filter called a sigma filter is known as a structure adaptive filter which controls filter strength according to an edge detected from image data. The sigma filter is a filter which generates a weighting function from data derived by enhancing an intermediate-frequency component or a high-frequency component in image data and which reduces noise while yet preserving the edge in the image data by weighted addition of image data and data derived by enhancing the intermediate-frequency component or the high-frequency component with the generated weighting function. The sigma filter is a filter which performs so-called edge preservation or edge enhancement. The correction processing (filtering) of data by the sigma filter can be represented as expression (1-1) and expression (1-2) when original data at one-dimensional position (x) to be a target of the filtering is $S_{orig}(x)$, high-frequency component (high pass filtered data) obtained by applying a high pass filter (HPF) to the original data $S_{orig}(x)$ is $S_{high}(x)$, low-frequency component (low pass filtered data) obtained by applying a low pass filter (LPF) to the original data $S_{orig}(x)$ is $S_{low}(x)$, a weighting function is $W_{high}(x)$, and corrected data after filtering is $S_{cor}(x)$.

$$W_{high}(x) = S_{high}(x)/\max[S_{high}(x)] \quad (1\text{-}1)$$

$$S_{cor}(x) = W_{high}(x) * S_{orig}(x) + \{1 - W_{high}(x)\} S_{low}(x) \quad (1\text{-}2)$$

That is, as shown in expression (1-1), the high-frequency component $S_{high}(x)$ is extracted as the edge part of the original data $S_{orig}(x)$ and the extracted high-frequency component $S_{high}(x)$ is normalized by the maximum value $\max[S_{high}(x)]$ of the high-frequency component $S_{high}(x)$. Then, the normalized high-frequency component is set as the weighting function $W_{high}(x)$. Subsequently, the corrected data $S_{cor}(x)$ is obtained by weighted addition of the original data $S_{orig}(x)$ and the low-frequency component $S_{low}(x)$ which is smoothing data with the weighting function $W_{high}(x)$.

On the other hand, the SNR adaptive filter is a filter which optimizes filter strength according to SNR of data. A Wiener Filter (WF) is proposed as a specific example of the SNR adaptive filter. More specifically, a Fourier WF (FTW) operating in normal frequency space and a FREBAS WF (FRW) operating in FREBAS space obtained by band division with Fresnel transform are proposed (for example, refer to Ito S., Yamada Y. "Use of Dual Fresnel Transform Pairs to Improve Signal-to-Noise Ratio in Magnetic Resonance Imaging," Med. Imag. Tech., 19 (5), 355-369 (2001)).

However, the proposed conventional FTW is a filter which improves SNR of data by processing in frequency space. Generally, a noise component (N) is approximately constant in a frequency space. However, since a signal component in higher frequency is more reduced, deterioration in high-frequency component of data cannot be avoided when SNR correction of the data is performed with the WF. On the other hand, since FREBAS space maintains a certain amount of space information, FRW can preserve high-frequency components including an edge in some degree compared to FTW. However, there is the problem that FRW does not operate adaptively to the SNR of the low-frequency component. Thus, SNR adaptive filter which operates adaptively according to SNR space distribution over a wide frequency band is not especially proposed.

SNR depends on not only frequency of data, but also position. That is, SNR is not uniform in real data space, is larger at a higher signal part and is smaller at a lower signal part.

There is the case that SNR is affected by processing in a display system to display data visually.

Furthermore, there are some data, derived by image processing in various modalities or each modality, of which values do not positively correlate with SNR. Especially, an example of data without positive correlation relationship between data value and SNR is processing data such as CT values obtained in an X-ray computed tomography (CT) apparatus and apparent diffusion coefficients (ADC) obtained in a magnetic resonance imaging (MRI) apparatus.

Note that a diffusion weighted signal for obtaining ADC changes according to a gradient magnetic field factor b and shows negative correlation relation with SNR. However, ADC is calculated from signal intensity S(b) of a diffusion weighted signal with expression (2). Therefore, when the signal intensity S(b) of the diffusion weighted signal increases in the case of S(b)<S(0), the ADC value becomes small. That is, SNR of ADC shows nonlinear correlation to SNR of signal intensity S(b) of a diffusion weighted signal. The SNR of ADC shows a peak when S(0)/S(b)=3 in relation with a diffusion weighted signal S(b). Furthermore, the SNR of ADC shows a peak when b×ADC=1.1 in relation with ADC value.

$$ADC = \ln\{S(0)/S(b)\}/b \quad (2)$$

Therefore, optimization processing method of SNR is different between the case that a data value and SNR have a positive correlation relationship and the case that a data value and SNR do not have a positive correlation relationship. However, today, a filter considering whether or not a value of data and SNR have positive correlation relationship is not proposed.

BRIEF SUMMARY

The present exemplary embodiment has been made in light of the conventional situations, and it is an object of the present exemplary embodiment to provide a data processing apparatus, a medical diagnostic apparatus, a data processing method and a medical diagnostic method which can correct data of time axis and/or spatial axis having random noise adaptively to SNR so as to reduce noise selectively while keeping a high frequency part and/or a high SNR part of the data.

The present exemplary embodiment provides a data processing apparatus comprising: SNR distribution data generating unit configured to generate SNR distribution data of processing target data based on the processing target data; a filter processing unit configured to generate filter processed data obtained by performing filter processing to the processing target data to improve SNR of the processing target data; a weighting function generating unit configured to generate a weighting function based on the SNR distribution data; and a corrected data generating unit configured to generate corrected data by performing weighted calculation between the processing target data and the filter processed data using the weighting function.

The present exemplary embodiment also provides a medical diagnostic apparatus comprising: a data acquisition unit configured to acquire processing target data from an object; SNR distribution data generating unit configured to generate SNR distribution data of the processing target data based on the processing target data; a filter processing unit configured to generate filter processed data obtained by performing filter processing to the processing target data to improve SNR of the processing target data; a weighting function generating unit configured to generate a weighting function based on the SNR distribution data; and a corrected data generating unit configured to generate corrected data by performing weighted calculation between the processing target data and the filter processed data using the weighting function.

The present exemplary embodiment also provides a data processing method comprising: generating SNR distribution data of processing target data based on the processing target data; generating filter processed data obtained by performing filter processing to the processing target data to improve SNR of the processing target data; generating a weighting function based on the SNR distribution data; and generating corrected data by performing weighted calculation between the processing target data and the filter processed data using the weighting function.

The present exemplary embodiment also provides a medical diagnostic method comprising: acquiring processing target data from an object; generating SNR distribution data of the processing target data based on the processing target data; generating filter processed data obtained by performing filter processing to the processing target data to improve SNR of the processing target data; generating a weighting function based on the SNR distribution data; and generating corrected data by performing weighted calculation between the processing target data and the filter processed data using the weighting function.

The data processing apparatus, the medical diagnostic apparatus, the data processing method and the medical diagnostic method as described above make it possible to correct data of time axis and/or spatial axis having random noise adaptively to SNR so as to reduce noise selectively while yet keeping data of a high frequency part and/or a high SNR part of the data.

BRIEF DESCRIPTION OF THE DRAWINGS

In the accompanying drawings:

FIG. 7 is a diagram showing, in time-series, an example of low pass filter processed data, a weighting function, a weighting function for an edge part and corrected data respectively generated by the calculation shown in FIG. 6;

DESCRIPTION OF THE PREFERRED EMBODIMENTS

A data processing apparatus, a medical diagnostic apparatus, a data processing method and a medical diagnostic method according to embodiments of the present invention will be described with reference to the accompanying drawings.

(Configurations and Functions)

Figure 1:
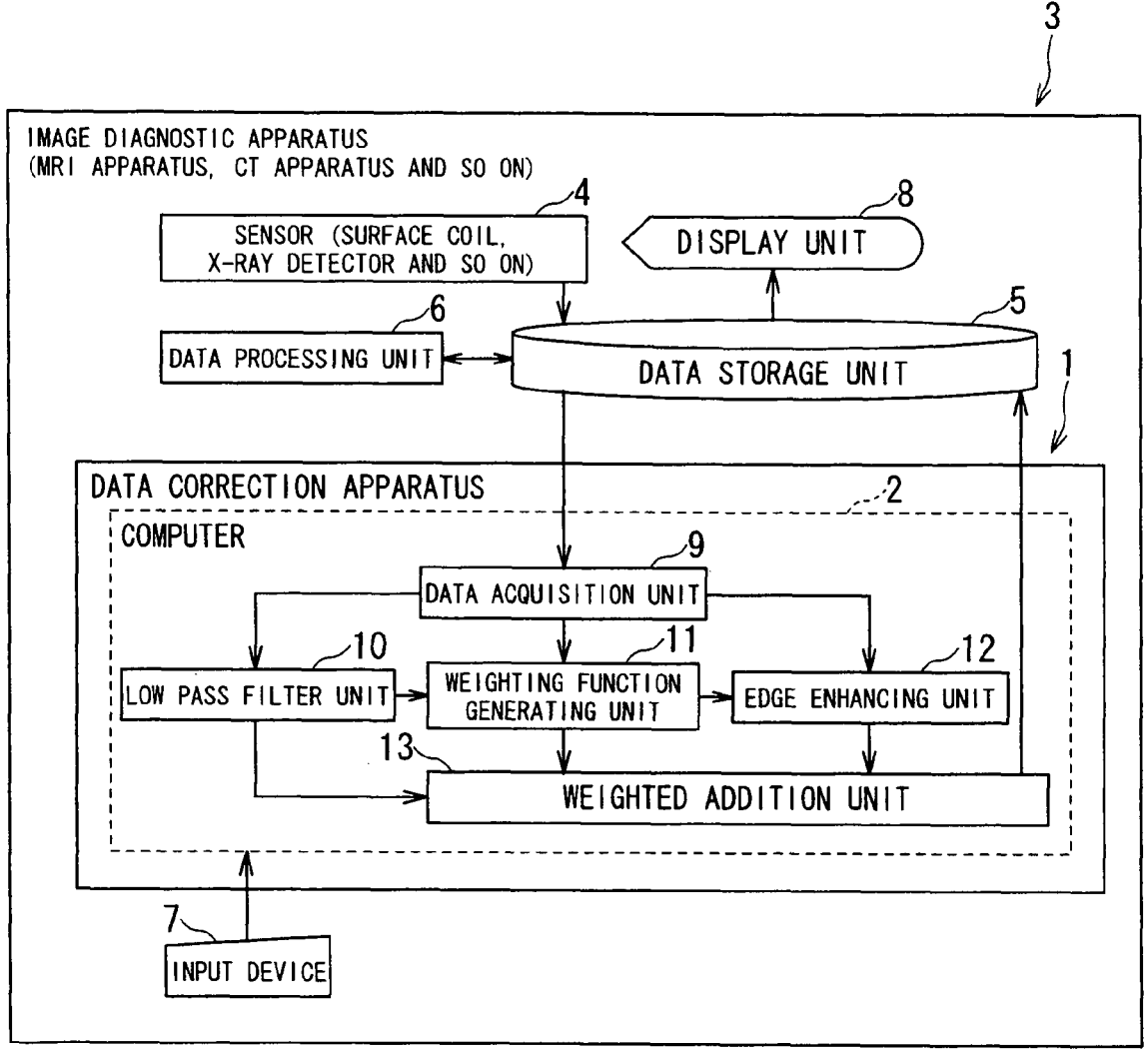
FIG. 1 is a block diagram showing a data processing apparatus according to an embodiment of the present invention.

FIG. 1 is a block diagram showing a data processing apparatus according to an embodiment of the present invention.

The data processing apparatus 1 is configured by loading a program into the computer 2. Note that the data processing apparatus 1 is also configured by providing circuits having various functions. The data processing apparatus 1 has a function to perform data processing to improve SNR by reducing random noise overlapping with data which has at least one of a temporal axis and a space axis. Specifically, the data processing apparatus 1 has a function to correct data adaptively to SNR so as to reduce noise selectively while retaining a high frequency part of the data and a high SNR part.

Every data with random noise having at least one of a temporal axis and a space axis can be applied as processing target data to be a target corrected by the data processing apparatus 1. For example, the data processing apparatus 1 can be built in a medical diagnostic apparatus and acquisition data such as raw data, image data, or temporal axis data acquired in the medical diagnostic apparatus can be processing target data by the data processing apparatus 1. Note that, as well as data obtained in a medical device, digital images such as an image by a digital camera, a satellite image, and a dynamic image can be processing target data in the data processing apparatus 1.

Examples of processing target data having time axis include an EEG (electroencephalogram), an ECG (electro cardiogram), an EMG (electromyogram), a MCG (magneto-cardiogram), a MMG (magnetomyogram) and a MEG (magnetoencephalogram). Examples of processing target data having spatial axis include data acquired by a medical image diagnostic apparatus. Concrete examples of medical image diagnostic apparatus include an X-ray diagnostic apparatus, a DF (digital fluorography) apparatus, a CT (computed tomography) apparatus, an MRI apparatus, a SPECT (single photon emission computed tomography) apparatus, a PET (positron emission computed tomography) apparatus and a US (ultrasonic) diagnostic apparatus.

In addition, when processing target data is data acquired by a medical image diagnostic apparatus, not only image data or time axis data but also projection data can be processing target data. Projection data is acquired by a medical image diagnostic apparatus such as an X-ray diagnostic apparatus, a CT apparatus, a SPECT apparatus, a PET apparatus or an MRI apparatus. Other practical processing target data include a T1 (longitudinal relaxation time) weighted image, a T2 (transverse relaxation time) weighted image and an ADC acquired by an MRI apparatus.

Therefore, the data processing apparatus 1 may be built in a medical equipment such as a medical image diagnostic apparatus or a electroencephalograph, or alternatively, be connected with a medical image diagnostic apparatus through a network. FIG. 1 shows an example of data processing apparatus 1 built in an image diagnostic apparatus 3.

The image diagnostic apparatus 3 has a sensor 4, a data storage unit 5, a data processing unit 6, an input device 7 and a display unit 8. The sensor 4 has a function to acquire processing target data by measuring, detecting or receiving the processing target data. When the image diagnostic apparatus 3 is an MRI apparatus, each RF (radio frequency) coil corresponds to the sensor 4. When the image diagnostic apparatus 3 is an X-ray CT apparatus, an X-ray detector corresponds to the sensor 4.

The data storage unit 5 has a function to store processing target data acquired by the sensor 4. The data processing unit 6 has a function to acquire the processing data from the data storage unit 5 to perform, to the acquired processing target data, data processing necessary for generating image data in the image diagnostic apparatus 3 and write the processing target data after the data processing into the data storage unit 5.

The data processing apparatus 1 is configured to generate corrected data by acquiring the processing target data from the data storage unit 5 and performing noise reduction correction to the acquired processing target data, and configured to output the generated corrected data to the data storage unit 5. Accordingly, the data processing apparatus 1 has a data acquisition unit 9, a low pass filter unit 10, a weighting function generating unit 11, an edge enhancing unit 12 and a weighting addition unit 13.

The data acquisition unit 9 has a function to acquire processing target data having spatially and/or temporally random noise from a medical equipment (which is the data storage unit 5 of the image diagnostic apparatus 3 in case of the example shown in FIG. 1), such as a medical image diagnostic apparatus or a electroencephalograph and supply the acquired processing target data as original data to the low pass filter unit 10, the weighting function generating unit 11 and an edge enhancing unit 12. In addition, the data acquisition unit 9 has a function to transform the processing target data so that values of the processing target data positively correlate with a SNR distribution of the processing target data in case where the values of the processing target data have a nonlinear or negative correlation relationship with the SNR distribution of the processing target data, to supply the transformed processing target data as original data to the low pass filter unit 10 and the edge enhancing unit 12, as needed.

The low pass filter unit 10 has a function to generate low pass filter processed data having a reduced noise by performing linear or nonlinear low pass filtering to the original data acquired from the data acquisition unit 9 and to provide the low pass filter processed data to the weighting function generating unit 11 and the weighting addition unit 13.

The weighting function generating unit 11 has a function to obtain SNR distribution data based on the original data acquired from the data acquisition unit 9 to generate a weighing function on which the SNR distribution data is reflected and to provide the generated weighing function to the weighting addition unit 13. However, the weighting function generating unit 11 is configured to acquire low pass filter processed data from the low pass filter unit 10 to generate SNR distribution data and a weighing function based on the low pass filter processed data when instruction for generating the SNR distribution and the weighing function based on the low pass filter processed data generated by the low pass filter unit 10 is inputted to the data processing apparatus 1 from the input device 7.

The edge enhancing unit 12 has a function to acquire the original data from the data acquisition unit 9 to extract edge parts corresponding to edge, linear and punctiform structures which are desired to be preserved in the original data when instruction for performing edge enhancement processing to the processing target data is inputted to the data processing apparatus 1 from the input device 7, to obtain a weighting function for the edge parts based on values of the extracted edge parts, and to provide the values of the extracted edge parts and the obtained weighting function for the edge parts to the weighting addition unit 13. In addition, the edge enhancing unit 12 is configured to provide a weighting function for the edge parts of which value is constantly zero to the weighting addition unit 13, as needed, when instruction not to perform edge enhancement processing to the processing target data is inputted to the data processing apparatus 1 from the input device 7.

The weighting addition unit 13 has a function to generate corrected data having a reduced random noise by performing weighted addition of the original data acquired from the data acquisition unit 9 and the low pass filter processed data acquired from the low pass filter unit 10 with using the weighting function acquired from the weighting function generating unit 11, and the edge parts of the original data acquired from the edge enhancing unit 12 with using the weighting function for the edge parts acquired from the edge enhancing unit 12 respectively. In addition, the weighting addition unit 13 is configured to output the generated corrected data to a designated output end when outputting instruction indicating the output end is inputted to the data processing apparatus 1 from the input device 7. In an example shown in FIG. 1, the weighting addition unit 13 is configured to output the corrected data to the data storage unit 5 of the image diagnostic apparatus 3. However, the weighting addition unit 13 may be configured to output the corrected data to the display unit 8 or a desired equipment through a network.

That is, the data processing apparatus 1 obtains a SNR distribution of original data from the original data of which signal intensity has a positive correlation relation with a SNR and generates a weighting function of which weight is larger at a higher SNR part and weight is smaller at a lower SNR part based on the SNR distribution. Furthermore, corrected data to which low pass filtering is performed with lower strength at the higher SNR part and with higher strength at the lower SNR part can be obtained by weighted addition of low pass filtered data smoothed by performing low pass filtering to the original data and the original data with using the weighted function according to the SNR distribution. The corrected data obtained as mentioned above becomes data in which the original data is preserved better at the higher SNR part and a noise is reduced by higher strength smoothing at the lower SNR part. That is, the corrected data becomes data derived by uneven noise reducing processing to data having an uneven noise. Additionally, edge enhancement can be also performed by extraction of edge parts from the original data for weighted addition.

(Operation)

Then, operation and action of the data processing apparatus 1 will be described.

Note that, here, description is given in case where processing target data is data acquired in the image diagnostic apparatus 3 and a weighting function is generated from low pass filtered data generated in the low pass filter unit 10.

The processing target data of an object is acquired at the sensor 4 in the image diagnostic apparatus 3 in advance and the acquired processing target data is stored in the data storage unit 5. The processing target data stored in the data storage unit 5 becomes a target of data processing for generating image data in the data processing unit 6. However, in the case of being a random noise in the processing target data, noise-reduction correction to the processing target data in the process of data processing is important. Here, depending on performing noise-reduction processing at the timing after which processing, there is a case where the processing target data has a relation of nonlinear correlation (or negative correlation) with a SNR distribution and a case where the processing target data has a relation of positive correlation with a SNR distribution.

As a specific example, the case where projection data acquired in an X-ray CT apparatus is the processing target data in the data processing apparatus 1 is described.

Figure 2:
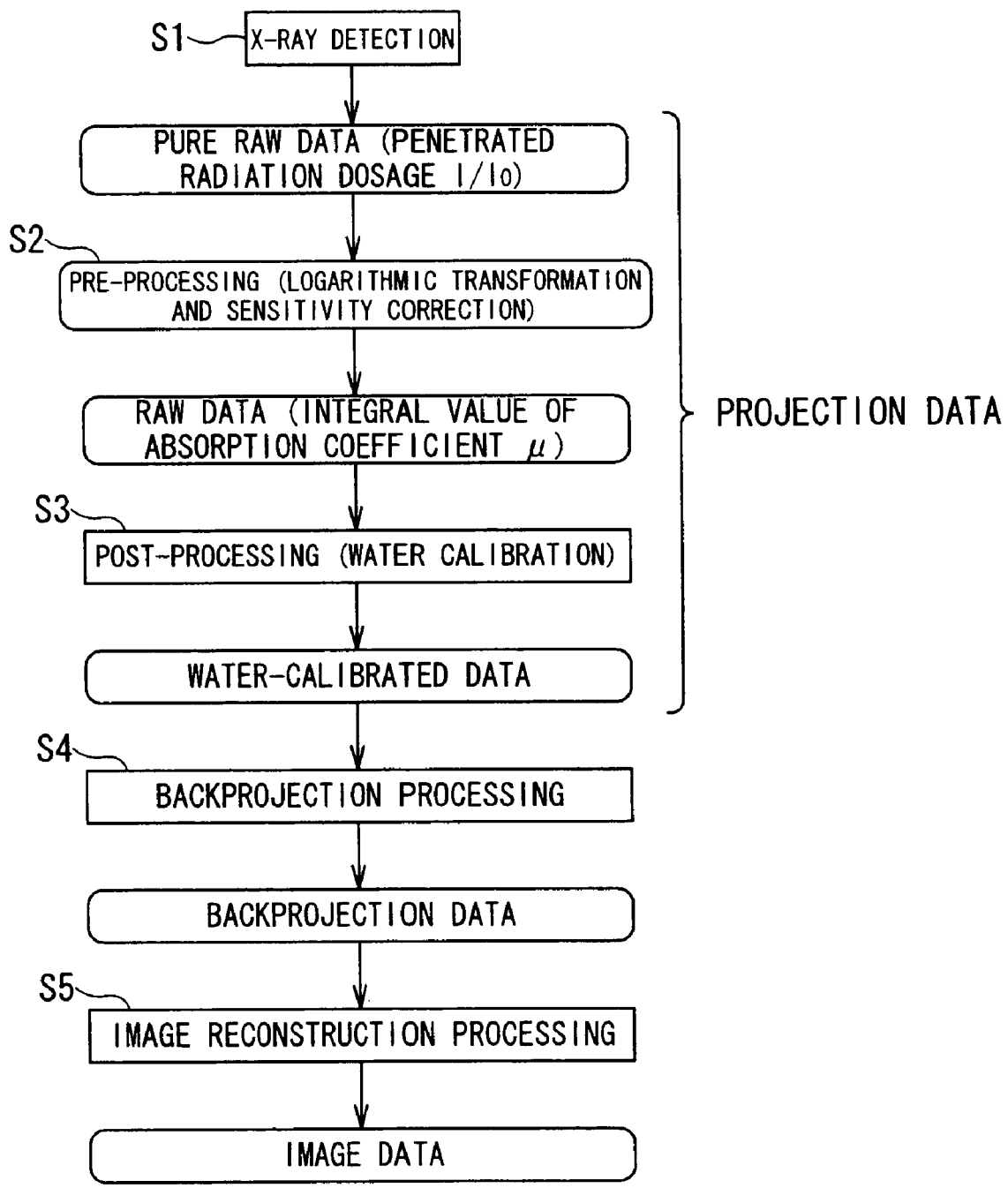
FIG. 2 is a flowchart showing a processing procedure of the data processing unit in case where the image diagnostic apparatus shown in FIG. 1 is an X-ray CT apparatus.

FIG. 2 is a flowchart showing a processing procedure of the data processing unit 6 in case where the image diagnostic apparatus 3 shown in FIG. 1 is an X-ray CT apparatus. The symbols each including S with a number in FIG. 2 indicate respective steps of the flowchart.

As shown in FIG. 2, in step S1, an X-ray which penetrated an object is detected by the X-ray detector which is the sensor 4 of the X-ray CT apparatus. Then, a distribution of penetrated radiation dosage $I/I_0$ is output as pure raw data from the X-ray detector. Subsequently, in step S2, pre-processing including logarithmic transformation and sensitivity correction to the distribution of penetrated radiation dosage $I/I_0$ which is the pure raw data is performed in the data processing unit 6. Consequently, the distribution of penetrated radiation dosage $I/I_0$ is transformed to an integral value of absorption coefficient $\mu$. Then, in the X-ray CT apparatus, not the distribution of penetrated radiation dosage $I/I_0$ of X-ray but the integral value of absorption coefficient $\mu$ of X-ray after pre-processing is often stored in the data storage unit 5 as raw data.

Then, in step S3, the raw data becomes water-calibrated data by post-processing including water calibration in the data processing unit 6. Then, in step S4, the water-calibrated data becomes back projection data by back projection processing in the data processing unit 6. Then, in step S5, image data corresponding to one image is generated by image reconstruction processing to plural pieces of back projection data corresponding to one image. Note that, pure raw data, raw data, and water-calibrated data before back projection processing are collectively called projection data.

Figure 3:
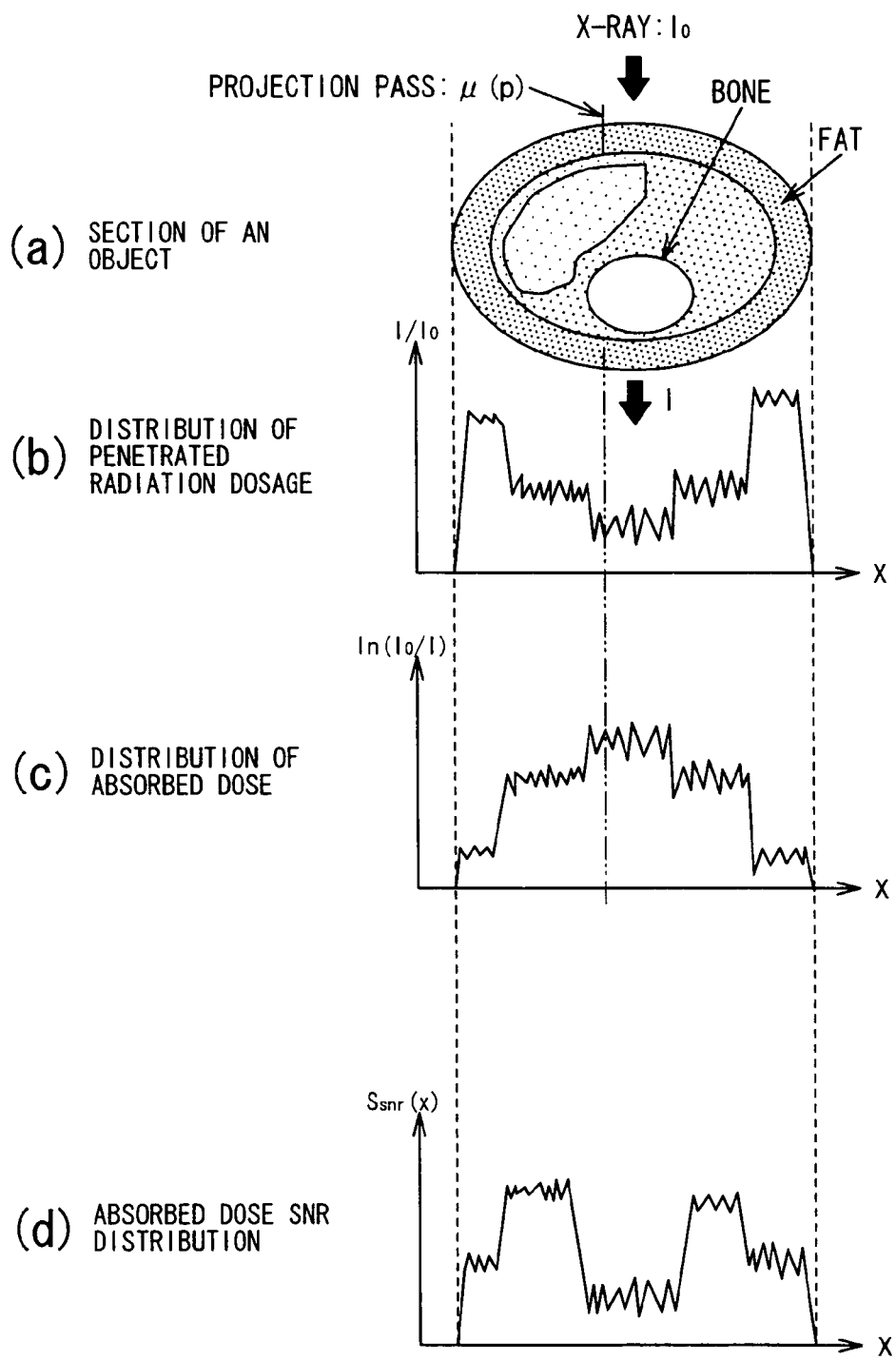
FIG. 3 is a diagram showing projection data acquired as processing target data for the data processing apparatus in case where the image diagnostic apparatus shown in FIG. 1 is an X-ray CT apparatus.

FIG. 3 is a diagram showing projection data acquired as processing target data for the data processing apparatus 1 in case where the image diagnostic apparatus 3 shown in FIG. 1 is an X-ray CT apparatus.

Note that, here, for ease, a case where the projection data has one-dimensional distribution in an x-axis direction perpendicular to a projection direction is described. Therefore, there is a case where processing target data has a distribution not only in the x-axis direction but also in a y-axis direction and/or in a z-axis direction each crossing the x-axis. When processing target data is time axis data, a distribution also exists in the time t-axis direction. The data, shown in each of figures including FIG. 7, having a space axis and/or a time axis described below is similar, there is also a case of n-dimensional data (n is a natural number) distributing in an x-axis, a y-axis, a z-axis, and a t-axis directions.

FIG. 3 (a) is a sectional view of an object which is a detection target of processing target data. FIG. 3 (b) shows an X-ray penetrated radiation dosage distribution $I/I_0$ at positions x obtained by detection of X-ray penetrating through the object shown in FIG. 3 (a) with an X-ray detector serving as the sensor 4 of an X-ray CT apparatus. FIG. 3 (c) shows an X-ray absorption dose distribution $\ln(I_0/I)$ at positions x obtained based on the X-ray penetrated radiation dosage distribution $I/I_0$ shown in FIG. 3 (b). FIG. 3 (d) shows a SNR distribution $S_{snr}(x)$ of the X-ray absorption dose shown in FIG. 3 (c).

As shown in FIG. 3 (a), a section of the object is covered with a fat and a bone and an organ exist inside the fat. An X-ray of incident count value $I_0$ per one out of plural detection elements included in the X-ray detector is irradiated to the object described above. Then, the X-ray which penetrated the object is detected in each X-ray detection element. Then, a distribution of penetrated radiation dosage $I/I_0$ of X-ray as shown in FIG. 3 (b) is output from the X-ray detector. The distribution of penetrated radiation dosage $I/I_0$ of X-ray is the penetrated radiation dosage ratio between penetrated radiation dosage which is an output count value of X-ray from the object, that is, a count value I of X-ray which one detection element receives after penetration through the object, and the incident count value $I_0$ per one detection element to the object.

When a absorption coefficient of X-ray on a projection line (pass) p is $\mu(p)$, an incident count value $I_0$ of X-ray to the object and an output count value I of X-ray form the object have a relation of expression (3).

$$I = I_0 \exp[-\int_p \mu(p) dp] \quad (3)$$

From expression (3), an X-ray absorption dose distribution obtained by logarithmic transformation to a reciprocal of the X-ray penetrated radiation dosage distribution $I/I_0$ represents an integral value of the absorption coefficient $\mu(p)$ as shown by expression (4).

$$\int_p \mu(p) dp = \ln [I_0/I] \quad (4)$$

As shown in FIG. 3 (b), the distribution of penetrated radiation dosage $I/I_0$ of X-ray, that is, signal values of pure raw data have a positive correlation relation with a SNR. That is, the distribution of X-ray penetrated radiation dosage $I/I_0$ becomes low in a pass passing through a substance of which absorption coefficient showing a degree of X-ray absorption is large, like a bone (calcium) and a metal substance such as an artificial femoral head. Specifically, assuming that sensitivities of X-ray detection elements are constant between channels, a SNR distribution $S_{snr}$ of a count value I in each detection element is proportional to the distribution of X-ray penetrated radiation dosage $I/I_0$. That is, expression (5) is established.

$$S_{snr} \propto I/I_0 \quad (5)$$

On the other hand, as shown in FIGS. 3 (c) and (d), a distribution of absorbed dose $\ln [I_0/I]$ at a position x showing a distribution of X-ray absorption coefficient $\mu(p)$, an absorption coefficient $\mu(x)$ and a CT value (CT#) after image reconstruction have a nonlinear correlation relation with SNR. Specifically, the distribution of absorbed dose $\ln [I_0/I]$ has a nonlinear relation in which a peak of SNR appears at $I_0/I=3$ with SNR. That is, in a pass passing through a substance, having a large absorption coefficient, such as a bone and in a poorly-absorbed pass, SNR becomes low. Note that, in a tomographic image of the object shown in FIG. 3 (a), a distribution of CT values is shown by luminance.

Then, as another specific example, a case where projection data acquired in a MRI apparatus is processing target data of the data processing apparatus 1 will be described.

Figure 4:
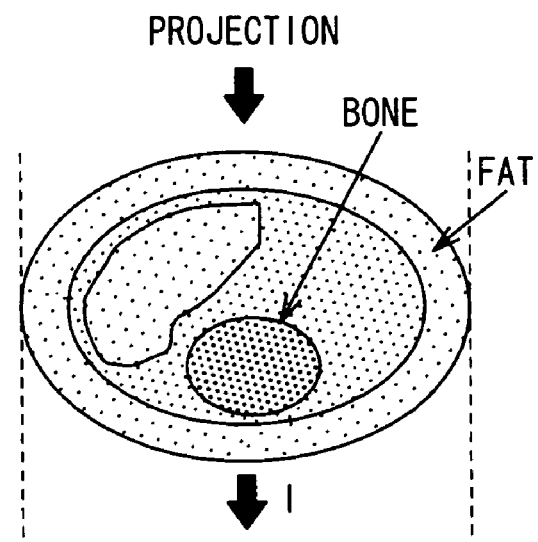
FIG. 4 is a diagram showing projection data acquired by a radial scan as processing target data for the data processing apparatus in case where the image diagnostic apparatus shown in FIG. 1 is an MRI apparatus.
Figure 4:
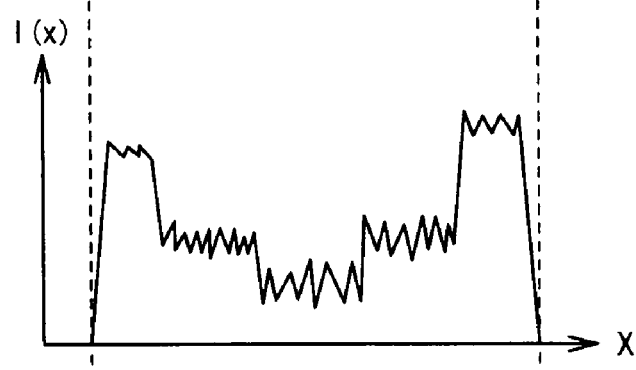

FIG. 4 is a diagram showing projection data acquired by a radial scan as processing target data for the data processing apparatus 1 in case where the image diagnostic apparatus 3 shown in FIG. 1 is an MRI apparatus.

FIG. 4 (a) is a sectional view of an object which is a detection target of the processing target data. FIG. 4 (b) is a diagram showing MR (magnetic resonance) signal intensities $I(x) = \int S_x(p) dp$ at positions x acquired from the object shown in FIG. 4 (a) by the radial scan with the MRI apparatus or their SNR distribution $S_{snr}(x)$.

Note that the radial scan is a scan for radially acquiring pieces of data passing the origin in k-space (Fourier space) with changing a gradient magnetic field. In k-space, pieces of data which are perpendicular to a projection direction and pass through the center correspond to the projection data. Therefore, MR signals acquired by a radial scan are projection data.

As shown in FIG. 4 (a), a section of the object is covered with fat and bone and an organ existing inside the fat. When MR signals are acquired from the object described above by a radial scan while determining a certain direction as the projection direction, the MR signals having signal intensities $I(x) = S_x(p) dp$ or SNR distribution $S_{snr}(x)$ at a position x perpendicular to the projection direction as shown in FIG. 4 (a) is obtained. As shown in FIG. 4 (a), normally, the signal intensities $S_x(p) dp$ of MR signals acquired by the radial scan shows positive correlation with the SNR distribution $S_{snr}(x)$.

The PROPELLER (periodically rotated overlapping parallel lines with enhanced reconstruction) is known as a data acquisition method similar to the radial scan. The PROPELLER is a method for acquiring data in k-space with rotating a blade which is a zonal region configured by plural parallel k-space loci with a central focus on the origin of k-space. Though not all data in k-space acquired by the PROPELLER pass through the center of k-space, the data in k-space acquired by the PROPELLER can be the processing target data of the data processing apparatus 1 like the data acquired by the radial scan. In this case, the set of the MR signals, having a distribution of signal intensities, corresponding to the number of parallel data rows in a blade is obtained.

Thus, a distribution of absorbed dose $\mu(p)$ which is one of projection data obtained by a projection method in the image diagnostic apparatus 3 such as an X-ray CT apparatus, a SPECT apparatus, and a PET apparatus has a property of a nonlinear correlation that SNR becomes low in projection data having a large value or the projection data obtained by passing through the pass p through which a value of data becomes low. On the contrary MR signals, acquired by a radial scan, corresponding to projection data in a MRI apparatus, have a property that SNR improves in the projection data passing through a pass making signal intensity high and derived from a signal source showing a large magnetization.

The data processing apparatus 1 can perform a noise-reduction correction processing to either processing target data of which signal intensity has a positive correlation relation with a SNR or processing target data of which signal intensity has a nonlinear correlation or a negative correlation relation with SNR, as described above. Therefore, desired data can be provided to the data processing apparatus 1 as processing target data. Then, when the processing target data is provided to the data processing apparatus 1, a correction for reducing random noise overlapping on the processing target data can be performed adaptively to SNR.

Furthermore, the input device 7 provides an instruction to whether to perform edge enhancement to preserve and enhance edge parts of the processing target data to the data processing apparatus 1 precedently to correction processing to the processing target data. Note that, whether or not to perform edge enhancement may be determined in advance without depending on instruction information from the input device 7.

Figure 5:
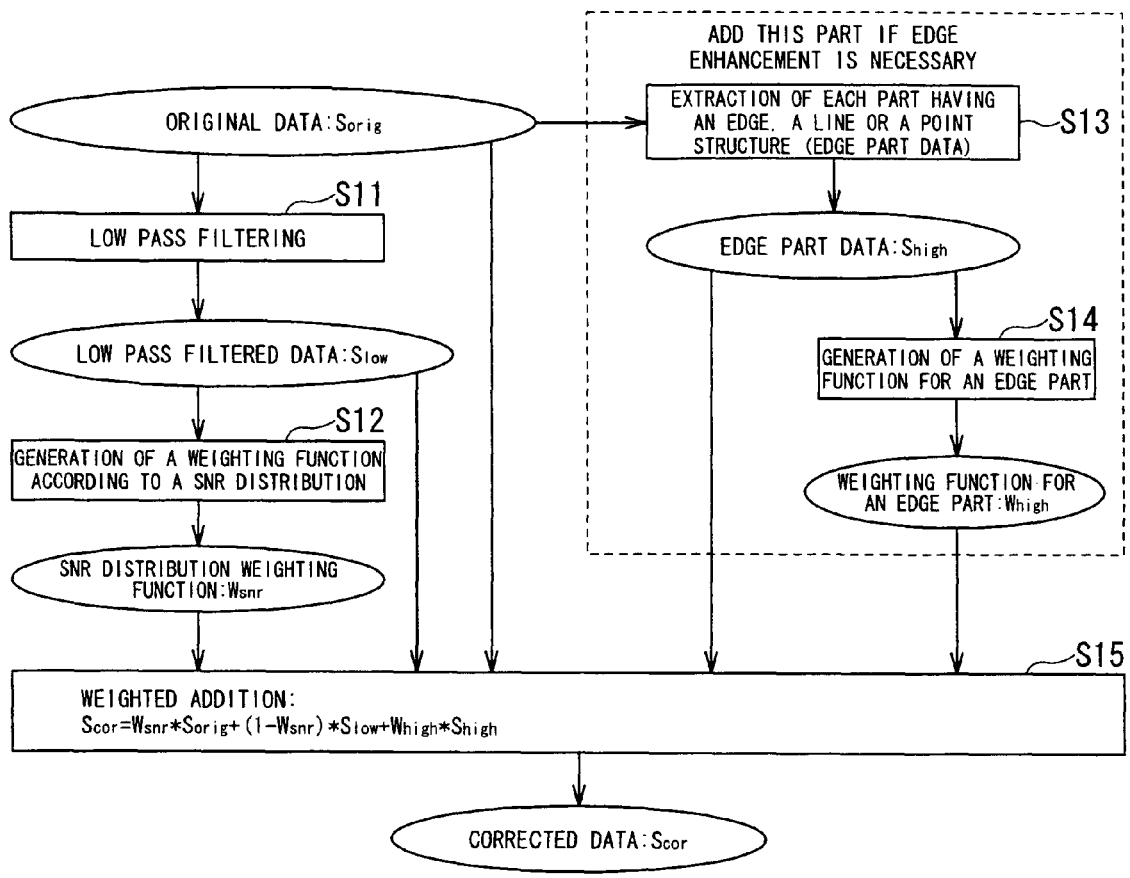
FIG. 5 is a flowchart showing a processing procedure for noise reduction processing, adaptively to a SNR, to data values of the processing target data by the data processing apparatus shown in FIG. 1.
Figure 6:
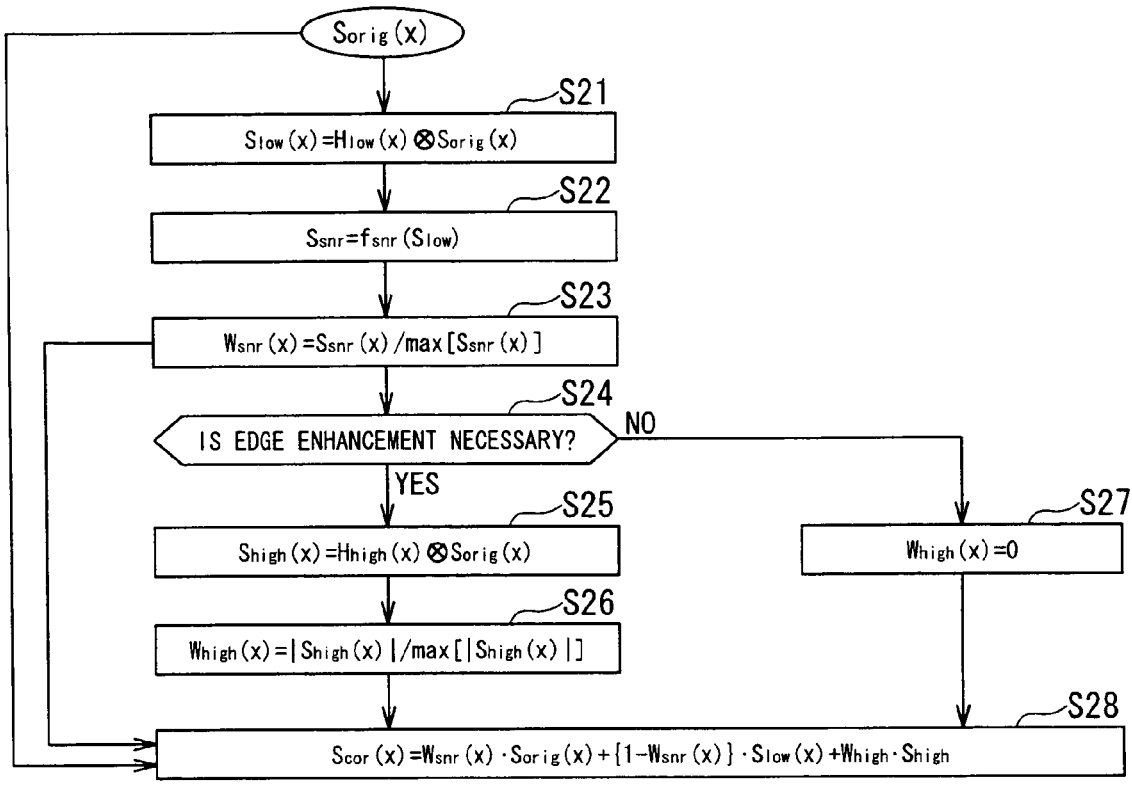
FIG. 6 is a flowchart showing a calculation procedure performed for noise reduction processing, adaptively to a SNR, to data values of the processing target data in the data processing apparatus shown in FIG. 1.

FIG. 5 is a flowchart showing a processing procedure for noise reduction processing, adaptively to a SNR, to data values of the processing target data by the data processing apparatus 1 shown in FIG. 1. FIG. 6 is a flowchart showing a calculation procedure performed for noise reduction processing, adaptively to a SNR, to data values of the processing target data in the data processing apparatus 1 shown in FIG. 1. The symbols each including S with a number in each of FIGS. 5 and 6 indicate respective steps of the corresponding flowchart. FIG. 7 is a diagram showing, in time-series, an example of low pass filter processed data, a weighting function, a weighting function for an edge part and corrected data respectively generated by the calculation shown in FIG. 6.

The data acquisition unit 9 obtains predetermined processing target data from the data storage unit 5 in the image diagnostic apparatus 3. Here, when the signal intensity of the obtained processing target data has a nonlinear correlation relation or a negative correlation relation with a SNR, the data acquisition unit 9 transforms the processing target data so that the signal intensity of the processing target data has a relation of positive correlation with the SNR. Then, the data with a positive correlation relation between the signal intensity and the SNR is set as original data $S_{orig}(x)$ at a position x for noise-reduction correction. Consequently, it is possible to obtain SNR distribution data from the original data $S_{orig}(x)$ in a step of a subsequent stage. Specifically, the original data $S_{orig}(x)$ showing a positive correlation relation with the SNR can be directly a SNR distribution function $S_{snr}(x)$ described below.

When signals $I(x)$ and a SNR of data intensity after transformation of the signals have a negative correlation relation, for example, as shown in expression (6-1), the data acquisition unit 9 can set a reciprocal of the signals $I(x)$ as the SNR distribution function $S_{snr}(x)$ showing the SNR distribution data of the original data $S_{orig}(x)$ at the position x for noise-reduction correction. On the contrary, since the signal intensities $I(x)$ of projection data at the position x acquired by the radial scan in the MRI apparatus as shown in FIG. 4 have a positive correlation relation with the SNR, as shown in expression (6-2), the signal intensities $I(x)$ can be directly set as the SNR distribution function $S_{snr}(x)$. As well as this example, when signal intensities of processing target data have a nonlinear correlation relation with a SNR, the processing target data can be transformed to the original data $S_{orig}(x)$ or the SNR distribution function $S_{snr}(x)$ by using a function $f_{snr}$ showing a nonlinear relation. For example, as shown in FIGS. 3 (c) and (d), when processing target data is a logarithmic transformation value $\ln [I_0/I(x)]$ of a reciprocal of a penetrated radiation dosage distribution $I/I_0$ equivalent to an integral value of X-ray absorption coefficient µacquired and preserved in an X-ray CT apparatus, the signal intensities of the processing target data have a nonlinear correlation relation with a SNR. Therefore, for example, as shown in expression (6-3), the data acquisition unit 9 can also transform a distribution of X-ray absorbed dose $\ln [I_0/I(x)]$ to a SNR distribution function $S_{anr}(x)$ using a nonlinear function $f_{snr}$.

$$S_{snr}(x)=1/I(x) \quad (6\text{-}1)$$

$$S_{snr}(x)=I(x) \quad (6\text{-}2)$$

$$S_{snr}(x)=f_{snr}[\ln \{I_0/I(x)\}] \quad (6\text{-}3)$$

On the contrary, when signal intensities of processing target data have a positive correlation relation with a SNR, the data acquisition unit 9 can directly set the processing target data as a SNR distribution function $S_{snr}(x)$ at the position x for noise-reduction correction.

Normally, since integral values $\int_p \mu(p)dp = \ln(I_0/I)$ of absorption coefficients µ of which signal intensities have a nonlinear correlation relation with a SNR are stored as the original data $S_{orig}(x)$ in an X-ray CT apparatus, it is realistic that the raw data which is the integral value of absorption coefficients µ is set as the processing target data from the perspective that setting a new storage unit and storing data are unnecessary.

Note that, in the case of reconstructing image data by using a projection method like an X-ray CT apparatus, it is efficient that data before back projection processing such as raw data is set as processing target data of the data processing apparatus 1. That is, since data having a low SNR is distributed uniformly on a projection line in back projection processing, performing back projection processing subsequently to a noise-reduction correction in advance makes it possible to reduce the risk of generating an artifact in a projection direction due to deterioration of a SNR and existence of a metal pin.

Note that, it is also possible that image data is set as processing target data and a noise-reduction processing can be performed in the data processing apparatus 1 with a method similar to that in case where projection data is set as processing target data.

The data acquisition unit 9 provides the original data $S_{orig}(x)$ obtained as mentioned above to the low pass filter unit 10 and the edge enhancing unit 12.

Then, in step S11 on FIG. 5, the low pass filter unit 10 performs linear or nonlinear low pass filtering to the original data $S_{orig}(x)$ obtained from the data acquisition unit 9. Consequently, low pass filtered data $S_{low}(x)$ having a reduced noise is generated. That is, as shown in step S21 of FIG. 6, the low pass filter unit 10 calculates the low pass filtered data $S_{low}(x)$ by multiplying the original data $S_{orig}(x)$ by a low pass filter $H_{low}(x)$.

In FIG. 7 (a), the abscissa denotes each position z and the ordinate denotes SI (signal intensity) of data. Further, in FIG. 7 (a), the solid line represents an example of low pass filter processed data $S_{low}(x)$ and the dotted line represents an example of original data $S_{orig}(x)$. As shown in FIG. 7 (a), it is possible to generate the smoothed low pass filter processed data $S_{low}(x)$ by low pass filtering to the original data $S_{orig}(x)$ having a local variation in signal intensity and a noise.

Note that, when the low pass filter is linear, processing becomes easy. By contraries, when the low pass filter is nonlinear, for example, a high-accuracy noise reduction processing to make a smoothing strength high locally can be performed. Examples of low pass filter include a LSI (linear space invariant) filter, a structure adaptive filter and a Wiener Filter (WF). A LSI filter has a uniform kernel (filter strength) and is a linear filter of which strength does not change temporally and spatially. A structure adaptive filter is a filter of which kernel is determined depending on a structure of data. A WF is a filter of which filter strength is determined so that a SNR becomes optimum in a processed space.

A filter strength of a filter except a WF is desired to be determined with using only filter processed signals S or an absolute SNR as an index. Note that, a filter strength can be defined by a reducing ratio with regard to a SD (standard deviation) of Gaussian noise.

Then, the low pass filter unit 10 provides the low pass filtered data $S_{low}(x)$ to the weighting function generating unit 11 and the weighted addition unit 13.

Subsequently, in step S12 on FIG. 5, the weighting function generating unit 11 generates a SNR distribution function $S_{snr}(x)$ showing SNR distribution data of original data $S_{orig}(x)$ based on the low pass filtered data $S_{low}(x)$ obtained through the low pass filter unit 10. This processing can be expressed as shown in step S22 on FIG. 6. That is, the SNR distribution function $S_{snr}(x)$ can be generated by transforming the low pass filtered data $S_{low}(x)$ with a function $f_{snr}(S)$ for generating a SNR distribution. The function $f_{snr}(S)$ for generating the SNR distribution can be a nonlinear transformation function according to a SNR distribution characteristic of data. Then, the obtained SNR distribution function $S_{snr}(x)$ can be directly set as a weighting function $W_{snr}(x)$ reflecting the SNR distribution data.

The low pass filtered data $S_{low}(x)$ can be also directly set as the SNR distribution function $S_{snr}(x)$. Note that, as described above, the original data $S_{orig}(x)$ may be also set as the SNR distribution function $S_{snr}(x)$ directly. The SNR distribution function $S_{snr}(x)$ can be also obtained by performing low pass filtering of the original data $S_{orig}(x)$ with a strength different from that of the low pass filter used for generating the low pass filtered data $S_{low}(x)$. That is, when the values of the original data $S_{orig}(x)$ have a positive correlation relation with the SNR, any of the original data $S_{orig}(x)$, the low pass filtered data $S_{low}(x)$, data obtained by nonlinear transformation of the original data $S_{orig}(x)$ or the low pass filtered data $S_{low}(x)$, and data reflecting each characteristic described above can be used as the SNR distribution function $S_{snr}(x)$ showing a SNR distribution.

Note that, the maximum weight value of the weighting function $W_{snr}(x)$ can be set to 1 with normalization, for example. By operation shown in step S23 of FIG. 6, values derived by normalizing the SNR distribution function $S_{snr}(X)$ with a maximum value $\max\{S_{snr}(x)\}$ of the SNR distribution function $S_{snr}(x)$ can be used as the weighting function $W_{snr}(x)$.

As mentioned above, when the weighting function $W_{snr}(x)$ reflecting a characteristic of the SNR distribution function $S_{snr}(x)$ is generated, the weighting function $W_{snr}(x)$ has a larger value (weighting) to a higher SNR part and a smaller value to a lower SNR part. In the case of generating the weighting function $W_{snr}(x)$ with normalization, the maximum value of the weighting function $W_{snr}(x)$ becomes 1. Therefore, the weighting function $W_{snr}(x)$ can be generated with reducing an effect of signal intensity dispersion between different pieces of processing target data. Furthermore, the noise of the SNR distribution function $S_{snr}(X)$ and/or the weighting function $W_{snr}(x)$ can be reduced by generating the SNR distribution function $S_{snr}(X)$ and/or the weighting function $W_{snr}(x)$ from the low pass filtered data $S_{low}(x)$.

In FIG. 7 (b), the abscissa denotes position x and the ordinate denotes weight W. Further, in FIG. 7 (b), the dashed line represents an example of weighting function $W_{snr}(X)$, the chain line represents the weighting function $1-W_{snr}(x)$ and the dotted line represents an example of data obtained by normalization of original data $S_{orig}(x)$. As shown in FIG. 7 (b), the weighting function $W_{snr}(x)$ generated by normalization of low pass filter processed data $S_{low}(x)$ becomes a function of which maximum value is 1 and of which value becomes higher in a higher SNR part and lower in a lower SNR part.

In addition, the SNR distribution function $S_{snr}(x)$ is not directly considered to be the weighting function $W_{snr}(x)$, and the weighting function $W_{snr}(x)$ can be also generated by nonlinear transforming the SNR distribution function $S_{snr}(x)$ with a nonlinear function g as shown in expression (7). A weight to a specific SNR part can be adjusted by nonlinear transformation of the SNR distribution function $S_{snr}(x)$.

$$W_{snr}(x)=g\{S_{snr}(x)\} \quad (7)$$

The nonlinear function g can be a function to generate the weighting function $W_{snr}(x)$ as follows, for example. A weight of the weighting function $W_{snr}(x)$ becomes zero to a part having an extremely small SNR of the SNR distribution function $S_{snr}(x)$, that is, when a signal intensity S is not over a threshold Smin. When a signal intensity S is higher than the threshold Smin, a weight becomes smaller to a part having a smaller SNR and larger to a part having a larger SNR. When the weighting function $W_{snr}(x)$ is generated as mentioned above, a smoothing strength to a part having a extremely small SNR can be high since the original data $S_{orig}(x)$ having the signal intensity S not over the threshold Smin is not directly reserved and becomes the low pass filtered data $S_{low}(x)$ by weighted addition in step of a subsequent stage.

In addition, the nonlinear function g can be a function to generate a weighting function $W_{snr}(x)$ as follows. A weight of the weighting function $W_{snr}(x)$ to a range between a maximum SNR part and a minimum SNR part considered as an edge part in the range not lower than the threshold Smin gradually decreases relatively along distance from the edge part. When the weighting function $W_{snr}(x)$ is generated as described above, a ratio of the original data $S_{orig}(x)$ reduces and a ratio of the low pass filtered data $S_{low}(x)$ increases at the part with more distance from an edge part by weighted addition in step of a subsequent stage. Therefore, smoothing with a larger strength is performed at the part with more distance from the edge part. Consequently, edge enhancement adaptive to a SNR distribution can be performed in addition to edge enhancement with extraction of an edge part.

In the case of example described above, the nonlinear function g can be determined as shown in expression (8).

$$g(S)=(S-Smin)^n/Smax: S>Smin, 0: \text{otherwise} \quad (8)$$

wherein Smax denotes the maximum value of signal intensity S and n denotes an arbitrary coefficient so that $(S)^n$ becomes a concave function (below convex function). Therefore, $(S)^n$ becomes a more concave function at a larger n.

Figure 8:
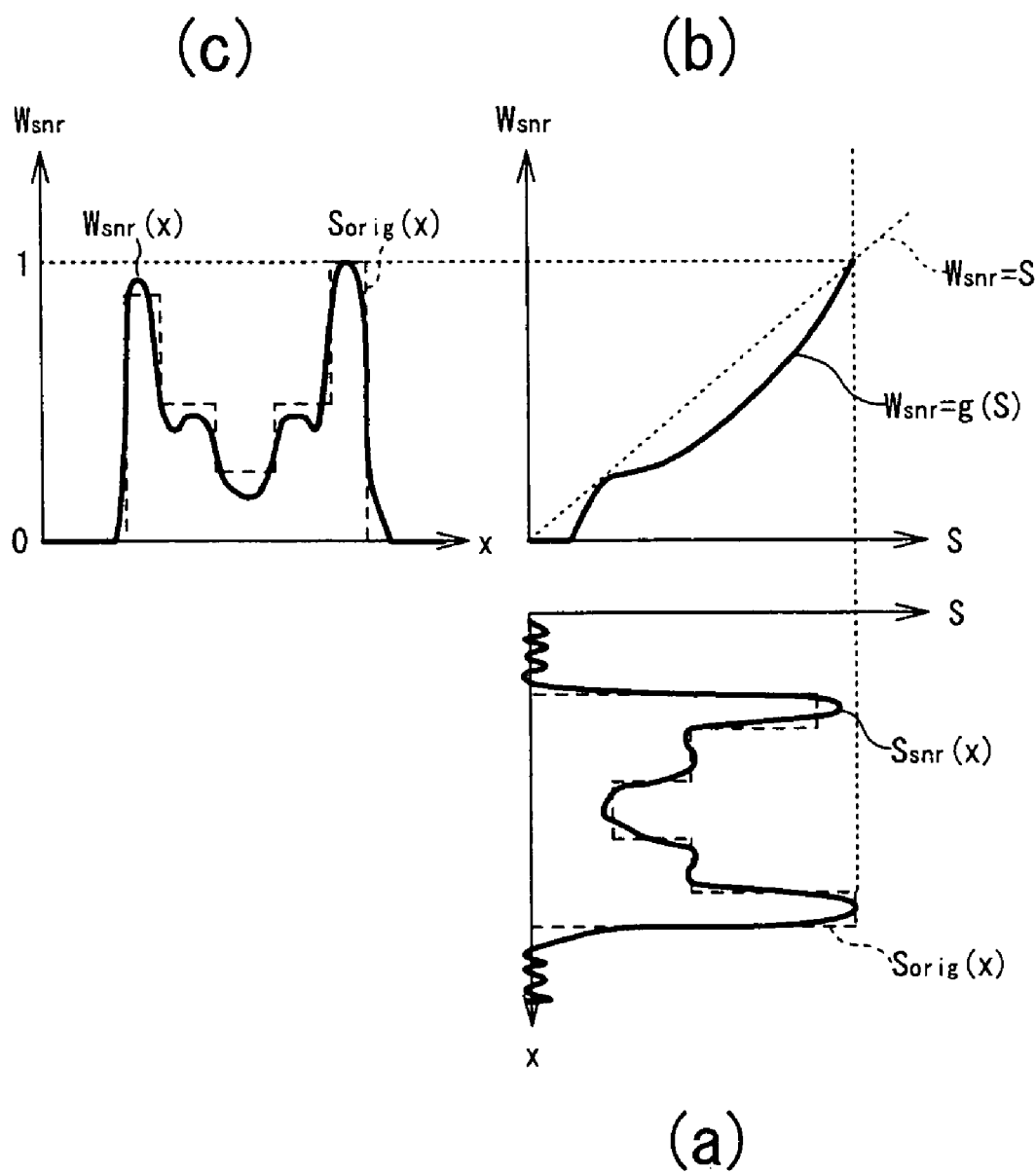
FIG. 8 is a diagram showing an example of a nonlinear function g used in case of generating a weighting function by performing a nonlinear transformation to a SNR distribution function in the data processing apparatus shown in FIG. 1.

FIG. 8 is a diagram showing an example of a nonlinear function g used in case of generating a weighting function by performing a nonlinear transformation to a SNR distribution function in the data processing apparatus 1 shown in FIG. 1.

In FIG. 8 (a), the abscissa denotes position x and the ordinate denotes signal intensity S. Further, in FIG. 8 (a), the solid line represents a SNR distribution function $S_{snr}(x)$ and the dotted line represents original data $S_{orig}(x)$ (or normalized original data $S_{orig}(x)$). In FIG. 8 (b), the ordinate denotes weight $W_{snr}$ of weighting function which results from a nonlinear transformation g and the abscissa denotes signal intensity S. Further, in FIG. 8 (b), the solid line represents a nonlinear function $W_{snr}=g(S)$ and the dotted line represents a linear function $W_{snr}=S$. In FIG. 8 (c), the ordinate denotes weight $W_{snr}$ of weighting function and the abscissa denotes position x. Further, in FIG. 8 (c), the solid line represents a weighting function $W_{snr}(X)$ obtained by the nonlinear transformation of the SNR distribution function $S_{snr}(x)$ with the nonlinear function $W_{snr}=g(S)$ and the dotted line represents the original data $S_{orig}(x)$ (or the normalized original data $S_{orig}(x)$).

As shown in FIG. 8 (a), the SNR distribution function $S_{snr}(X)$ occasionally has an extremely-low SNR part and/or an edge part at the end of position x. In the case described above, if the SNR distribution function $S_{snr}(X)$ is nonlinear-transformed by using the nonlinear function $W_{snr}=g(S)$ of which weight $W_{snr}$ is zero to the signal intensities not over a specific value and becomes relatively low to the signal intensities having an approximate intermediate value as shown in FIG. 8 (b), the weighting function $W_{snr}(x)$ of which weight $W_{snr}$ of a part having an extremely-low SNR is zero and weight $W_{snr}$ of a part whose signal intensities correspond to an edge part except an intermediate part is enhanced can be generated as shown in FIG. 8 (c).

On the other hand, as described above, the original data $S_{orig}(X)$, the low pass filtered data $S_{low}(x)$, and the data obtained by nonlinear transformation of the original data $S_{orig}(x)$ or the low pass filtered data $S_{low}(x)$ can be used as the SNR distribution function $S_{snr}(x)$ and the SNR distribution function $S_{snr}(X)$ can be also used as the weighting function $W_{snr}(x)$ directly.

Figure 9:
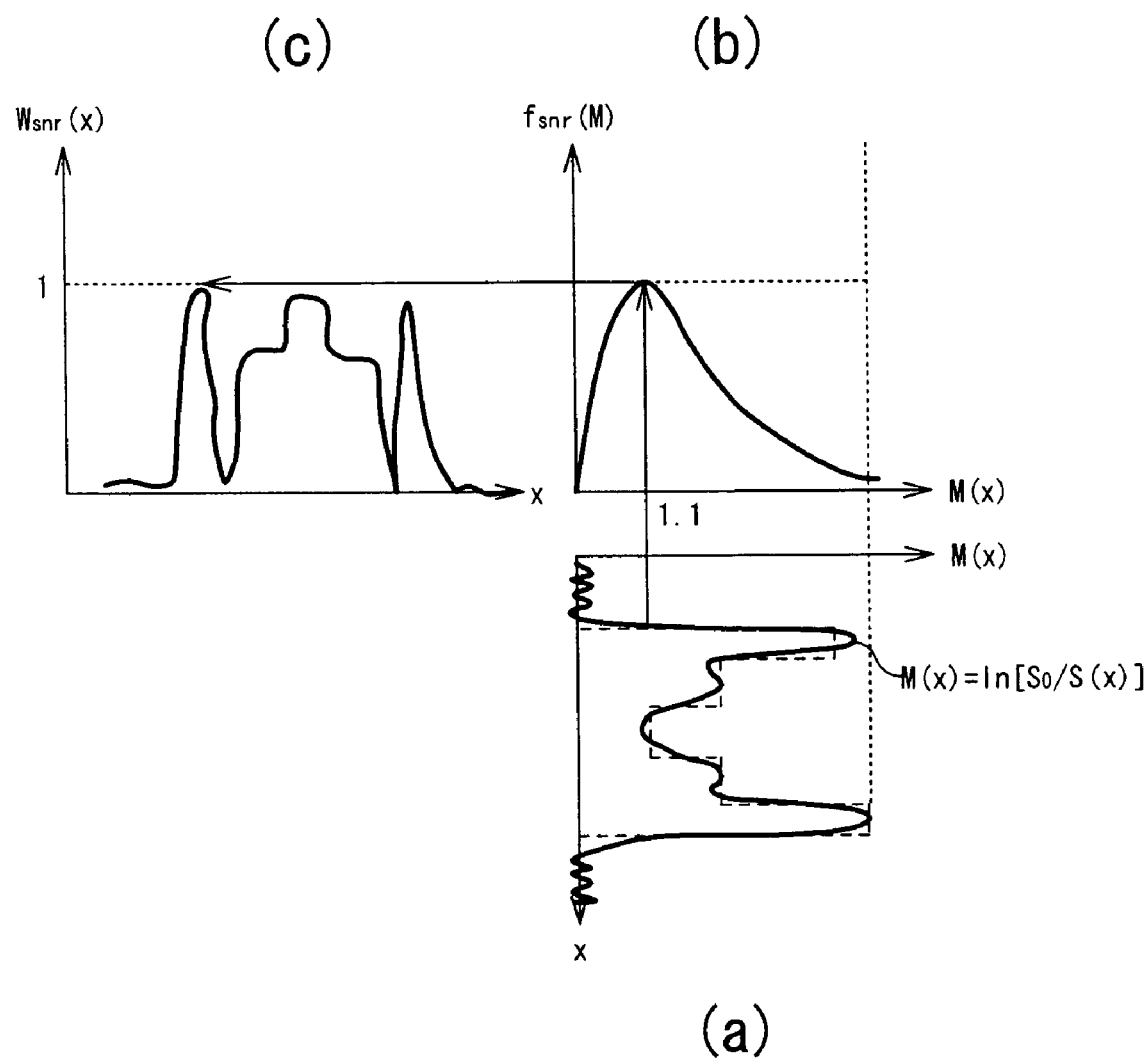
FIG. 9 is a diagram showing an example case of using a SNR distribution function obtained by transforming original data, having a nonlinear correlation relationship with its SNR showing a peak, with a nonlinear function for generating a SNR distribution as a weighting function as it is in the data processing apparatus shown in FIG. 1.

FIG. 9 is a diagram showing an example case of using a SNR distribution function $S_{snr}(x)$ obtained by transforming original data $S_{orig}(x)$, having a nonlinear correlation relationship with its SNR showing a peak, with a nonlinear function $f_{snr}(S)$ for generating a SNR distribution as a weighting function $W_{snr}(x)$ as it is in the data processing apparatus 1 shown in FIG. 1.

Hereinafter, a case of deriving the nonlinear function $f_{snr}$ used for SNR distribution function transformation will be described with an X-ray CT as an example.

In an X-ray CT apparatus, the SNR of projection data $\ln(I_0/I)$ of absorbed dose distribution which is an integral value of absorption coefficient stored as raw data has a nonlinear correlation relation showing a peak at $I_0/I=3$, that is, $\ln(I_0/I)=1.1$. Similarly, when the signal intensity of DWI corresponding to a gradient magnetic field factor b value is denoted by S (b), ADC obtained in a MRI apparatus does not have negative correlation but has a nonlinear correlation relation showing a peak at $S(0)/S(b)=3$ with the signal intensity S (b) of DWI at b>0. The relation between a SNR of ADC and ADC values is a nonlinear correlation relation showing a peak when b×ADC=1.1. T2 weighted image data and the reciprocal of T2 relaxation time obtained in a MRI apparatus are also similar.

Thus, when each of reference signal value $S_0$ and signal value $S(x)$ at a position x has a random noise and the signal value $S(x)$ is larger than zero and is not over the reference signal value $S_0$, a SNR of data $M(x)$ at the position x defined by expression (9) is known to have a characteristic showing a maximum value at $S(x)/S_0=\frac{1}{3}$, that is, $M(x)=1.1$ with regard to the signal intensity of data $M(x)$.

$$M(x)=-\ln\{S(x)/S_0\}(0<S(x)\leq S_0) \quad (9)$$

The characteristic of a SNR can be calculated as below. In expression (9), when $R=S/S_0$, a SD of noise in the data $M(x)$ is denoted by $\tau_M$ and a SD of R is denoted by $\sigma_R$, relationship shown by expression (10-1) is derived. Therefore, the SNR (M) of the data $M(x)$ can be calculated with using the SNR(R) of R as expression (10-2).

$$\sigma_M=\sigma_R(\delta M/\delta R)=\sigma_R(1/R) \quad (10\text{-}1)$$

$$SNR(M)=M/\sigma_M=-\ln(R)/\{\sigma_R(1/R)\}$$

$$=-R\times\ln(R)/\sigma_R=-\ln(R)\times(R/\sigma_R)$$

$$=-\ln(R)\times SNR(R)(0<R\leq 1) \quad (10\text{-}2)$$

In expression (10-2), under a condition of $0<R\leq 1$, $\ln(R)$ decreases in monotone and SNR(R) increases in monotone when R increases. Therefore, SNR(M) has a relation showing a peak at $R=\frac{1}{3}$ ($M(x)=\ln(1/R)=1.1$).

Further, in expression (10-2), when $\sigma_R=1$ and SNR(M) is represented with using M, expression (11) can be derived.

$$SNR(M)=-\ln(R)\times R=M\times\exp(-M)(M>0) \quad (11)$$

Here, a SNR distribution function $f_{snr}(M)$ of an integral value M of absorption coefficient (or CT value after reconstruction) in case of X-ray CT is given by expression (12) by which SNR(M) is normalized with the maximum value of the SNR(M).

$$f_{snr}(M)=SNR(M)/\text{Max}[SNR(M)] \quad (12)$$

Then, the SNR distribution function $f_{snr}(M)$ is expressed by expression (13) from expressions (11) and (12).

$$f_{snr}(M)=e\times M\times\exp(-M)(M>0) \quad (13)$$

FIG. 9 (a) shows an example of data $M(x)$ after a logarithmic transformation defined by expression (9). In FIG. 9 (a), the abscissa denotes x axis and the ordinate denotes each value of data $M(x)$. FIG. 9 (b) is a diagram of which abscissa denotes data M (=$-\ln[R]$) based on expression (10-2) and ordinate denotes each value of the SNR distribution function $f_{snr}(M)$ expressed by expression (13). FIG. 9 (c) shows a weighting function $W_{snr}(x)$ obtained by transforming the data $M(x)$ serving as a SNR spatial distribution with the SNR distribution function $f_{snr}(M)$.

In the case of having a nonlinear relation between the values of data $M(x)$ to be a noise correction target and the SNR as mentioned above, by using the nonlinear function $f_{snr}$ showing a relation between the value of the data $M(x)$ and the SNR, the data $M(x)$ such as an X-ray absorption coefficient distribution or ADC distribution can be transformed to the SNR distribution function $S_{snr}(x)$ based on the SNR distribution of the data $M(x)$.

Then, the weighting function $W_{snr}(x)$ generated as mentioned above is provided to the weighted addition unit 13 from the weighting function generating unit 11.

Subsequently, in step S13 shown on FIG. 5, the edge enhancing unit 12 determines whether or not the instruction for performing edge enhancement processing to the processing target data is input to the data processing apparatus 1 from the input device 7. Then, when the instruction for performing edge enhancement processing to the processing target data is input to the data processing apparatus 1, the edge enhancing unit 12 acquires the original data $S_{orig}(x)$ from the data acquisition unit 9 and extracts an edge part corresponding to each part having an edge, a line or a point structure to be preserved of the original data $S_{orig}(x)$.

That is, in step S24 on FIG. 6, the edge enhancing unit 12 determines whether edge enhancement is necessary or not, and then, in a case of the determination of YES, the edge part is extracted. Specifically, the edge part data $S_{high}(x)$ of an intermediate frequency component or a high frequency component is extracted by applying the original data $S_{orig}(x)$ with a high pass filter $H_{high}(x)$ according to the operation shown in step S25 of FIG. 6.

Subsequently, in step S14 on FIG. 5, in the edge enhancing unit 12, the weighting function $W_{high}(x)$ for the edge part to enhance the edge part $S_{high}(x)$ is obtained from the edge part data $S_{high}(x)$. That is, the weighting function $W_{high}(x)$ for the edge part is generated from the intermediate frequency component or the high frequency component of the original data $S_{orig}(x)$. Specifically, for example, according to the operation shown in step S26 of FIG. 6, by normalizing the absolute value $|S_{high}(x)|$ of the edge part data $S_{high}(x)$ with the maximum value $\max\{|S_{high}(x)|\}$ of the absolute value $|S_{high}(x)|$ of the edge part data $S_{high}(x)$, the weighting function $W_{high}(x)$ for the edge part which reflects the characteristic of the signal intensity of the edge part $S_{high}(x)$ and has the maximum value 1 is generated.

In FIG. 7 (c), the abscissa denotes position x and the ordinate denotes weight W. Further, in FIG. 7 (c), the dashed line represents an example of a weighting function $W_{high}(x)$ for edge parts and the dotted line represents an example of data obtained by normalization of original data $S_{orig}(x)$. As shown in FIG. 7 (c), the weighting function $W_{high}(x)$ for edge parts becomes a function of which maximum value is 1 and having weights W only on edge parts.

The edge part data $S_{high}(x)$ and the weighting function $W_{high}(x)$ for the edge part obtained as mentioned above are provided to the weighted addition unit 13 from the edge enhancing unit 12.

On the contrary, when the edge enhancing unit 12 determines the instruction not to perform edge enhancement processing to the processing target data is input to the data processing apparatus 1, extraction processing of the edge part data $S_{high}(x)$ and generation processing of the weighting function $W_{high}(x)$ for the edge part are not performed. Note that, as shown in step S27 of FIG. 6, because of necessity on the operation, zero may be substituted to the weighting function $W_{high}(x)$ for the edge part and the weighting function $W_{high}(x)$ for the edge part of which value is zero is provided to the weighted addition unit 13.

Subsequently, in step S14 on FIG. 5, the weighted addition unit 13 generates the corrected data $S_{cor}(x)$ with a reduced random noise by performing the operation shown in step S28 of FIG. 6. That is, weighted addition is performed with setting the weighting function $W_{snr}(x)$ obtained from the weighting function generating unit 11 as the weight of the original data $S_{orig}(x)$ and the weighting function $1-W_{snr}(x)$ as the weight of the low pass filtered data $S_{low}(x)$ obtained from the low pass filter unit 10 respectively. Furthermore, in the case of performing edge enhancement, the weighted addition of the edge part data $S_{high}(x)$ obtained from the edge enhancing unit 12 is performed with setting the weighting function $W_{high}(x)$ for the edge part obtained from the edge enhancing unite 12 as the weight.

Consequently, the corrected data $S_{cor}(x)$ with noise level reduced can be obtained by smoothing with a higher strength at the part with a lower SNR of the original data $S_{orig}(x)$. In addition, by weighted addition of the edge part data $S_{high}(x)$, the edge part can be enhanced.

In FIG. 7 (d), the abscissa denotes position x and the ordinate denotes SI (signal intensity) of data. Further, in FIG. 7 (d), the solid line represents an example of corrected data $S_{cor}(x)$ and the dotted line represents an example of original data $S_{orig}(X)$. As shown in FIG. 7 (d), corrected data $S_{cor}(x)$ of which parts each having lower SNR are smoothed at larger strengths with enhancing edge parts are enhanced can be obtained.

Then, the corrected data $S_{cor}(x)$ generated as mentioned above is output to the data storage unit 5 in the image diagnostic apparatus 3 from the weighted addition unit 13. Note that, the corrected data $S_{cor}(x)$ can be also output to other devices. Then, image data for display is reconstructed by data processing to the corrected data $S_{cor}(x)$ in the data processing unit 6 of the image diagnostic apparatus 3. For example, when the corrected data $S_{cor}(x)$ is obtained by correction of the projection data acquired in the X-ray CT apparatus, the image data for display can be generated though necessary processing including post-processing, back projection processing, and image reconstruction processing to the corrected data $S_{cor}(x)$ in the data processing unit 6.

Note that, up to here, examples without using information relating to a window transformation performed in display processing when the weighting function $W_{snr}(x)$ is generated are described. However, in a case where the processing target data of the data processing apparatus 1 is image data, a new weighting function $W_{snr}(x)$ can be also generated by using information used for the window transformation in a display system.

Figure 10:
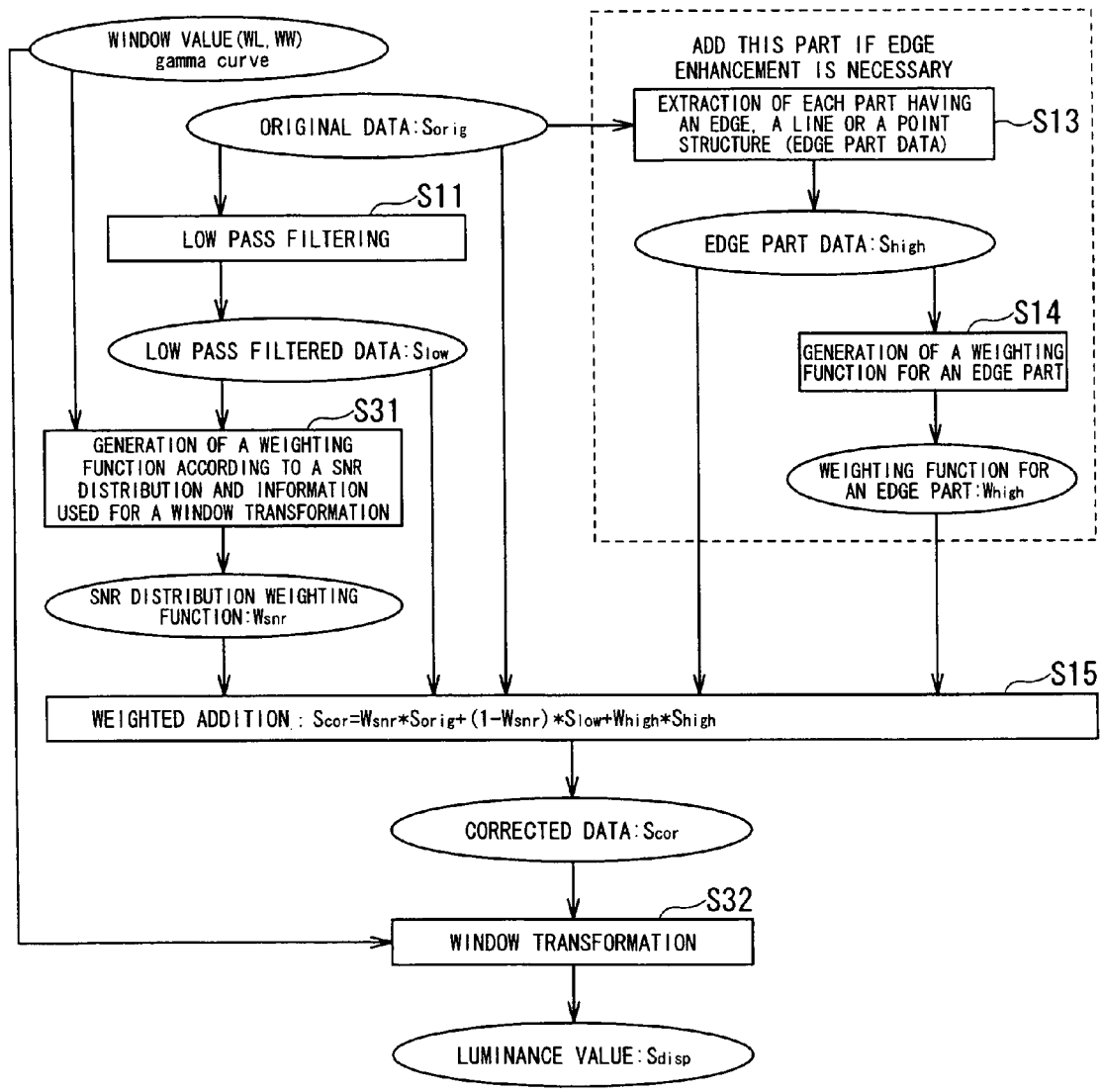
FIG. 10 is a flowchart showing a processing procedure for performing noise reduction processing to data values of the processing target data adaptively to its SNR by generating a weighting function with using information used for a window transformation by the data processing apparatus shown in FIG. 1.

FIG. 10 is a flowchart showing a processing procedure for performing noise reduction processing to data values of the processing target data adaptively to its SNR by generating a weighting function with using information used for a window transformation by the data processing apparatus 1 shown in FIG. 1. The symbols each including S with a number in FIG. 10 indicate respective steps of the flowchart.

The flowchart shown by FIG. 10 is different from the flowchart shown by FIG. 5 only in points of using information used for a window transformation for generating a weighting function and obtaining luminance values $S_{disp}$ by a window transformation to corrected data $S_{cor}$. Therefore, a same sign is attached to each step, in the flowchart shown by FIG. 10, equivalent to a step of the flowchart shown by FIG. 5 and description thereof is omitted.

As shown in step S31 of FIG. 10, in the case where the processing target data is the image data, in the weighting function generating unit 11, a weighting function $W_{snr}(x)$ according to not only the SNR distribution but also information used for the window transformation can be generated. There are window setting values including window level (WL) and window width (WW), and a gamma curve as examples of information, used for the window transformation, used for generating the weighting function $W_{snr}(x)$.

In step S32, the image data which is the corrected data $S_{cor}$ after weighted addition using the weighting function $W_{snr}(x)$ is subjected to the window transformation. The image data is subjected to the window transformation based on the window setting values (WL, WW) and the signal intensity is often displayed as a contrast value which is a luminance value of the display unit 8. The window transformation may be a nonlinear transformation using a gamma curve or a linear transformation.

Figure 11:
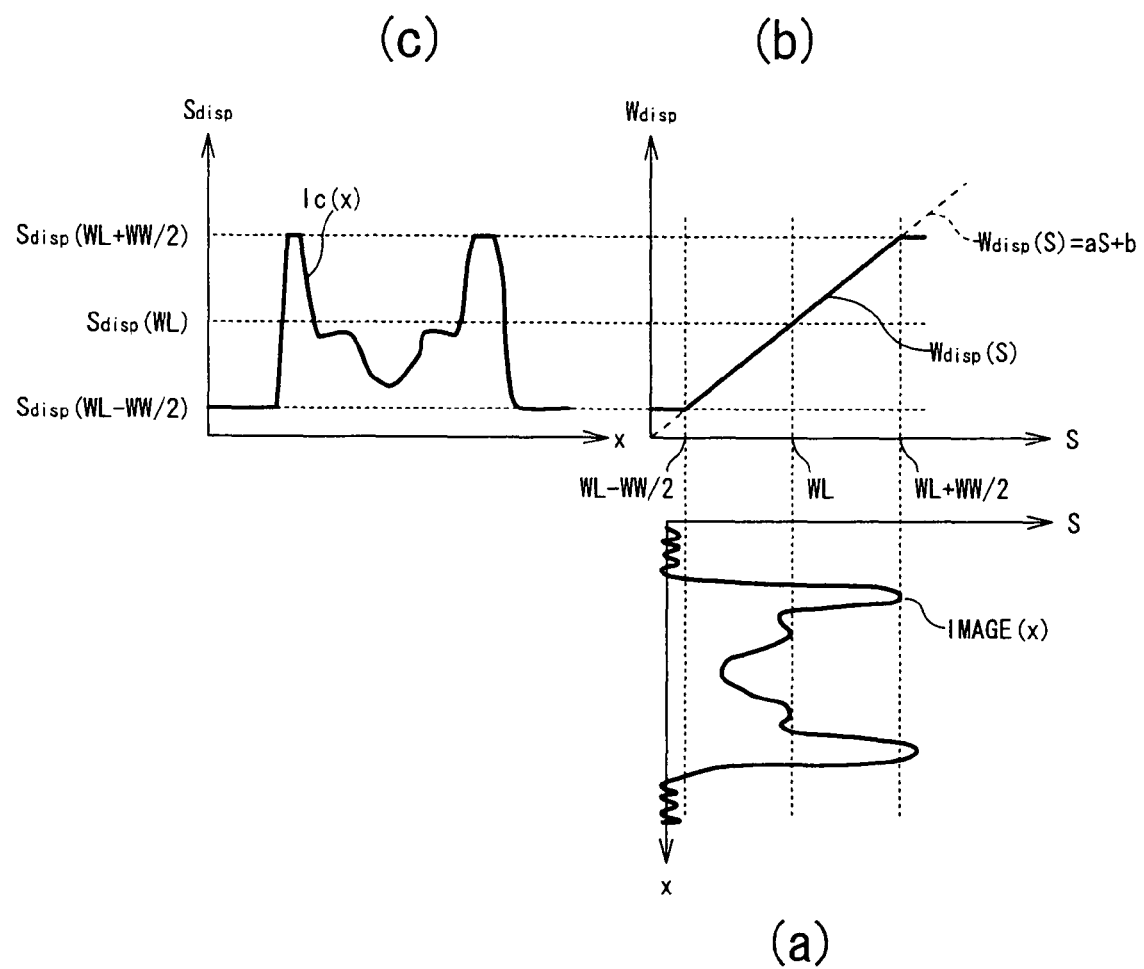
FIG. 11 is a diagram showing an example of performing a linear window transformation to image data in the data processing unit of the image diagnostic apparatus shown in FIG. 1.

FIG. 11 is a diagram showing an example of performing a linear window transformation to image data in the data processing unit 6 of the image diagnostic apparatus 3 shown in FIG. 1.

In FIG. 11 (a), the ordinate denotes position x and the abscissa denotes signal intensity S, and the solid line represents image data IMAGE(x) at each position x. In FIG. 11 (b), the ordinate denotes contrast value (luminance value) C and the abscissa denotes signal intensity S. Further, in FIG. 11 (b), the solid line represents a window transforming function $W_{disp}(S)$ and the dashed line represents a linear function $W_{disp}=aS+b$. In FIG. 11 (c), the ordinate denotes contrast value $S_{disp}$ and the abscissa denotes position x. Further, in FIG. 11 (c), the solid line shows a luminance distribution Ic(x) of a display image obtained by a linear window transformation of the image data IMAGE(x) with using the window transforming function $W_{disp}(S)$.

The image data IMAGE(x) shown by the signal intensity S as shown in FIG. 11 (a) is subjected to the window transformation by the window transformation function $W_{disp}(S)$ shown in FIG. 11 (b) to be transformed to the luminance distribution Ic(x) of the display image shown by the contrast value $S_{disp}$ as shown in FIG. 11 (c). For the purpose, the window setting values WL, WW are determined arbitrarily. Subsequent to determination of the window setting values WL, WW, the window transformation function $W_{disp}(S)$ is generated as a function by which the signal intensity S is transformed to the intermediate contrast value $S_{disp}(WL)$ at the signal intensity S=WL, to the maximum contrast value $S_{disp}(WL+WW/2)$ at the signal intensity S□WL+WW/2 and to the minimum contrast value $S_{disp}(WW-WW/2)$ at the signal intensity S≦WL-WW/2 respectively.

The weighting function $W_{snr}(x)$ considering display processing in the display system of the image data IMAGE(x) can be generated by generating the window transformation function $W_{disp}(S)$ based on the window setting values (WL, WW) to transform the SNR distribution function $S_{snr}(x)$ of the image data IMAGE(x) with the window transformation function $W_{disp}(S)$. That is, by adapting the weighting function $W_{snr}(X)$ to display processing in the display system, noise-reduction correction processing can be matched with visual effect.

For example, the window transformation function $W_{disp}(S)$ can be determined in line with a policy that the SNR of the luminance distribution Ic(x) of the display image becomes highest when the signal intensity S of the image data IMAGE (x) is WL (S=WL) while the SNR of the luminance distribution Ic(x) of the display image may become low as the signal intensity S of the image data IMAGE(x) departs from WL and a difference |S-WL| between the signal S and WL increases.

Figure 12:
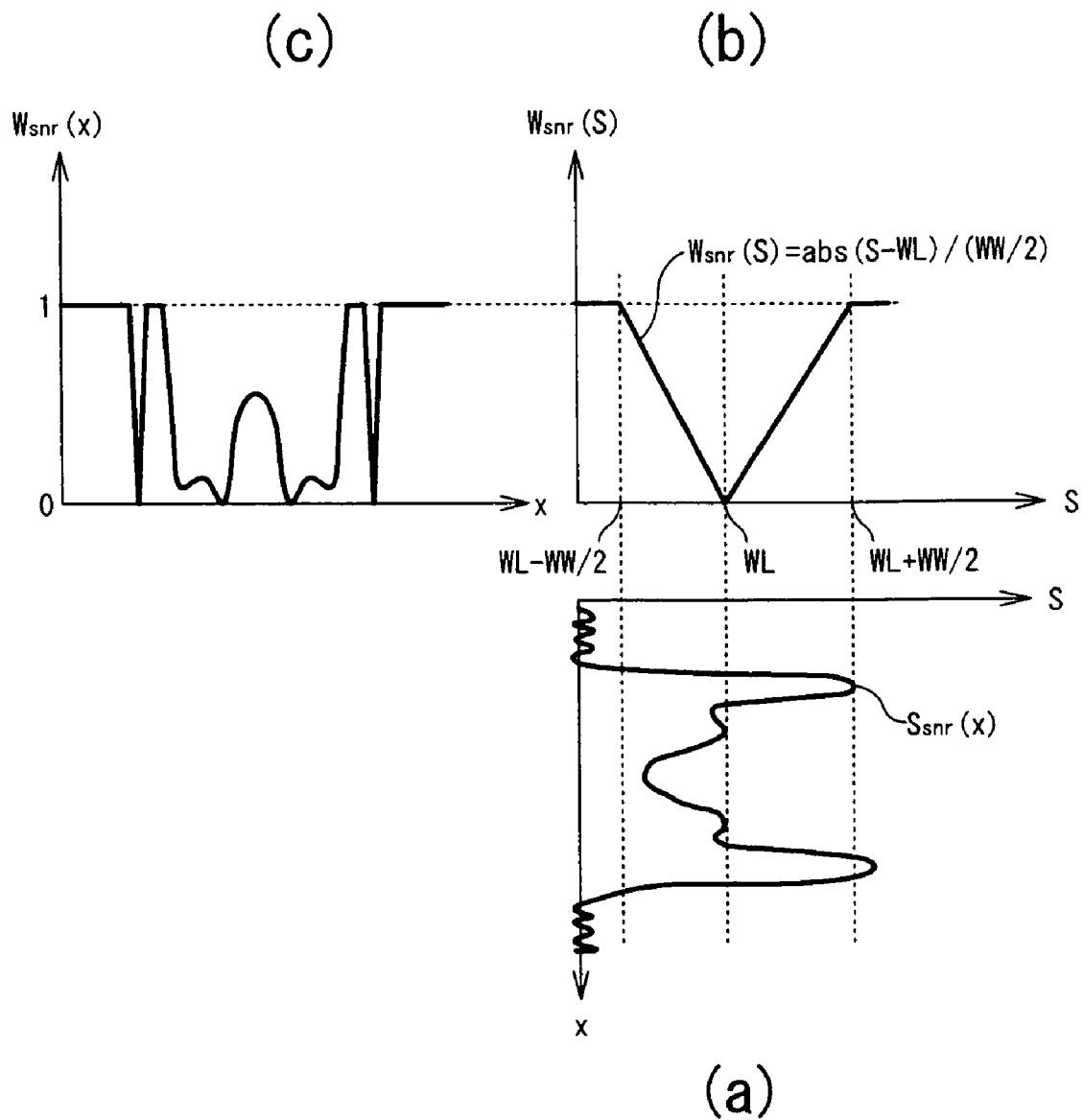
FIG. 12 is a diagram showing an example case of generating a weighting function by transforming a SNR distribution function with using a transforming function based on a window set value in step S31 of FIG. 10.

FIG. 12 is a diagram showing an example case of generating a weighting function by transforming a SNR distribution function with using a transforming function based on a window set value in step S31 of FIG. 10.

In FIG. 12 (a), the ordinate denotes position x and the abscissa denotes signal intensity S at each position x, and the solid line represents a SNR distribution function $S_{snr}(x)$ of image data IMAGE(x). In FIG. 12 (b), the ordinate denotes weight $W_{snr}(S)$ of a weighting function which is values obtained by transforming the signal intensities S with a transforming function $W_{snr}(S)$ and the abscissa denotes signal intensity S. Further, in FIG. 12 (b), the solid line represents the transforming function $W_{snr}(S)$. In FIG. 12 (c), the ordinate denotes weight $W_{snr}(x)$ of a weighting function and the abscissa denotes position x. Further, in FIG. 12 (c), the solid line represents a weighting function $W_{snr}(x)$ obtained by transforming the SNR distribution function $S_{snr}(x)$ with using the transforming function $W_{snr}(S)$.

The weighting function $W_{snr}(x)$ adapting to window transformation processing shown in FIG. 12 (c) can be generated by transforming the SNR distribution function $S_{snr}(x)$ as shown in FIG. 12 (a) with the transformation function $W_{snr}(S)$, shown in FIG. 12 (b), determined by the policy described above. Note that, the transformation function $W_{snr}(S)$ shown in FIG. 12 (b) shows an example of function of which weight W is zero at the signal intensity S=WL of the SNR distribution function $S_{snr}(x)$ and is 1 at the signal intensity $S \geqq WL+WW/2$ and $S \leqq WL-WW/2$ respectively. That is, when the window transformation is linear, the transformation function $W_{snr}(S)$ can be determined as expression (14) for example.

$$W_{snr}(S)=|S-WL|/(WW/2): WL-WW/2<S<WL+WW/2,$$
$$1: \text{otherwise} \quad (14)$$

Then, the corrected data $S_{cor}(x)$ of the image data IMAGE (x) is generated by the weighted addition with the weighting function $W_{snr}(x)$ generated as mentioned above. Furthermore, by the window transformation shown in FIG. 11, the display image having a reduced random noise and showing a SNR adjusted according to visual effect is generated from the corrected data $S_{cor}(x)$ and is displayed on the display unit 8.

Note that, the window conditions including the window setting values (WL, WW) and the gamma curve can be set arbitrarily by a user through the operation of the input device 7. Therefore, when a user changes the window conditions, the weighting function generating unit 11 can be configured to dynamically generate the weighting function $W_{snr}(x)$ in synchronization with the set window conditions. Furthermore, in addition to synchronization of the weighting function $W_{snr}(x)$, the corrected data $S_{cor}(x)$ and the display image after the window transformation can be also dynamically generated and displayed in synchronization with the set window conditions respectively.

Note that, once the gamma curve out of window conditions is set, the set gamma curve is not changed often. Furthermore, the window setting values (WL, WW) is often approximately determined depending on data type normally when an image having an absolute value such as an X-ray CT image or a MR image derived by normalization of the signal intensity is displayed. Accordingly, the window conditions such as the window setting values (WL, WW) and the gamma curve may be stored as preset values in the data processing apparatus 1 in advance, and the weighting function generating unit 11 can also be configured to generate the weighting function $W_{snr}(X)$ based on a preset value automatically. Consequently, since it is not necessary to often change the window conditions, a display image can be generated and displayed by less processing without performing dynamically data correction processing including generation of the weighting function $W_{snr}(x)$ plural times.

Aside from this, by setting the window conditions automatically according to a condition determined arbitrarily in advance, the weighting function generating unit 11 can also be configured to generate the weighting function $W_{snr}(x)$ based on the window conditions set automatically. For example, if a condition for setting the window condition by which the largest image value is set to WL and twice WL is set to WW on a histogram of image values in a part other than background such as air is determined in advance, the data processing apparatus 1 or the image diagnostic apparatus 3 can set the window conditions automatically according to the setting condition. This allows generating and displaying a display image with only one data correction processing including generation of the weighting function $W_{snr}(x)$ and the weighted addition. As mentioned above, the display image can be generated and displayed with less processing by automation of setting of the window conditions as well.

In addition, as well as the window conditions, parameters for determining conditions relating to the data correction processing described above such as the degree of the nonlinear transformation necessary for generating the weighting function $w_{snr}(x)$ and the value of the weighting function $W_{high}(x)$ for the edge part in case of performing edge enhancement can be adjusted manually by operation of the input device 7. Especially, it is often preferable that the degree of the nonlinear transformation and the weight of the edge component can be adjusted according to preference of a user. For example, when a dynamic data correction processing can be performed in real-time by dial adjustment such as voice tone control, a user can optimize a correction accuracy of the display image referring the image displayed on the display unit 8.

That is, the data processing apparatus 1 as described above is an apparatus to obtain a SNR distribution from the provided processing target data and corrected data by performing weighted addition of the processing target data and the data derived by performing linear or nonlinear filtering to the processing target data using the weighting function reflecting the characteristic of the SNR distribution.

(Effect)

Consequently, in the data processing apparatus 1 described above, even if the processing target data is data of which SNR changes locally, the SNR can be improved with reducing a noise adaptively according to the SNR. That is, a preservation ratio of high frequency component can be controlled in addition to reduction of noise. In addition, in the data processing apparatus 1, it is possible to preserve and enhance an edge component in a local as needed.

Since the data processing apparatus 1 can perform processing equivalent to nonlinear processing with easy linear processing, high speed processing is possible. This allows achieving dynamic processing in real-time.

Furthermore, the data processing apparatus 1 has an advantage that degree of freedom of a space to be able to apply correction processing is high. For example, correction processing can be performed in a various space such as a real space, a projection data space, and a frequency space. That is, since a linear filter such as a LSI filter is used for filtering, even though the processing target data is the data processed by a convolution method in a real space or by a FT (Fourier transform) method in a frequency space, the processing target data can be applied as a target of correction processing.

The data processing apparatus 1 can perform correction processing of the processing target data not only in a case of having a positive correlation relation between a value of the processing target data and a SNR but also in a case of having a nonlinear or a negative correlation relation between a value of the processing target data and a SNR. That is, when the processing target data is the normal data which have positive correlation relation between a signal value and a SNR, smoothing can be performed with a higher strength to a part having a smaller signal value and a smaller SNR. On the contrary, when a signal value and a SNR of the processing target data have nonlinear correlation relation or negative correlation relation, smoothing strength can become higher to a part having a larger signal and a smaller SNR.

The data processing apparatus 1 can optimize a weighting function in synchronization with not only an absolute intensity of a signal which is a data value such as an image value but also a gamma curve and window setting values (WL, WW) for determining a luminance value output on the display unit 8. Therefore, a correction of the processing target data matching with visual effect can be performed.

Furthermore, the data processing apparatus 1 has an advantage which that another data like a sensitivity distribution of the sensor 4 is unnecessary since processing target data is used to obtain a SNR distribution.

Especially, the recent MRI apparatus has often plural surface coils as coil elements of the RF coil corresponding to the sensor 4. In this case, since each surface coil has a sensitivity distribution, data acquired by each surface coil has a random noise. Therefore, it is significant to perform correction processing for reducing noises, due to the sensitivity distributions, overlapping on pieces of data from the plural surface coils. As one method for it, there is a method for obtaining a SNR distribution by using sensitivity distribution data or an estimated value of the sensitivity distribution of each surface coil and performing reduction correction of noises due to the sensitivity distributions of the surface coils according to the SNR distribution.

To the contrary, by using the data processing apparatus 1, the sensitivity distribution data or estimation of the sensitivity distributions of the surface coils becomes unnecessary and a SNR distribution can be obtained from the data from the surface coils directly. That is, in the data processing apparatus 1, the processing target data or the data derived by filter processing to the processing target data is used as the weighting function reflecting the SNR distribution. Therefore, when a spatial SNR distribution or a noise distribution of the processing target data is constant, a local SNR distribution can be obtained without the sensitivity distribution data of the sensor 4 for acquiring the processing target data.

Note that, when the SNR distribution is obtained by using the sensitivity distribution data, the SNR distribution can be obtained in advance precedently to processing to the processing target data according to the specific sensitivity distribution data of the sensor 4. On the other hand, when the SNR distribution is obtained from the processing target data, it is necessary to obtain the SNR distribution every time the processing target data is subjected to correction processing since the SNR distribution is obtained depending on the processing target data. Therefore, there is a possibility to have a longer processing time in a case of obtaining the SNR distribution from the processing target data compared to a case of obtaining the SNR distribution by using the sensitivity distribution data.

However, when the weighting function $W_{snr}(X)$ is generated by simple linear filtering in the data processing apparatus 1, simple filter processing is increased only one time compared to a case where generating the weighting function $W_{snr}(X)$ is unnecessary. Further, processing time of weighted addition processing itself can be ignored. Therefore, in the data processing apparatus 1, high-speed processing as described above is possible.

Note that, when magnetic resonance signals, corresponding to respective surface coils or reception channels, acquired by performing parallel imaging (PI) with a MRI apparatus having plural surface coils as sensors are set as pieces of processing target data of the data processing apparatus 1 respectively, each corrected data $S_{cor}(x)$ can be compounded subsequent to performing the noise correction processing described above to each piece of processing target data.

PI is an image method for receiving pieces of echo data by using plural surface coils and reducing the number of phase encodes necessary for image reconstruction by skipping a phase encode. When pieces of echo data are acquired by the PI, unfolded image data is generated by performing unfolding processing which is post-processing in PI based on a condition of PI to image data corresponding to each surface coil.

In this case, plural pieces of filter processed data are generated by filter processing to plural pieces of processing target data acquired by using plural surface coils respectively and plural weighting functions are generated respectively based on plural pieces of SNR distribution data. Then, plural pieces of corrected data are generated by performing weighted operations of the plural pieces of processing target data and the plural pieces of filter processed data with the plural weighting functions. Furthermore, the plural pieces of corrected data are compounded. For this purpose, in a case of correcting respective pieces of the processing target data from plural sensors or reception channels, a compound unit for compounding plural pieces of corrected data corresponding to the plural pieces of processing target data respectively is equipped in the data processing apparatus 1.

Since a spatial sensitivity distribution necessarily exists in the data corresponding to every channel acquired with a multi coil, even in a part which does not raise a problem in a case of performing uniform filtering and image reconstruction after data is acquired by using the coil having a uniform sensitivity distribution, a low signal part filled with a noise necessarily exists. Therefore, especially, when PI is performed in a MRI apparatus, a SNR can be improved better than that for sum of square compound with a conventional uniform filter.

There is an X-ray CT apparatus including plural sets of X-ray detectors as an image diagnostic apparatus including a multi-channel detector. In this case, similarly, each corrected data $S_{cor}(x)$ corresponding to every channel may be compounded.

What is claimed is:

1. A data processing apparatus comprising at least one data processor configured to provide:
    a signal to noise (SNR) distribution data generating function which generates SNR distribution data of processing target data;
    a filter processing function which generates filter processed data obtained by performing filter processing on the processing target data to improve a SNR of the processing target data based on windowing information to be used in a subsequent window transformation;
    a weighting function generating function which generates a weighting function based on the SNR distribution data; and
    a corrected data generating function which generates corrected data by performing weighted calculation between the processing target data and the filter processed data using the weighting function,
    wherein said at least one data processor is further configured to provide:
    a setting function configured to automatically set at least one of a window width, a window level and a gamma curve as the information used for the window transformation synchronously based on an operation of an input device, as a preset value or according to a predetermined condition; and
    a display function configured to display data generated on the corrected data when the information used for the window transformation is synchronously set based on operation of the input device.

2. A data processing apparatus of claim 1,
wherein said SNR distribution data generating function is configured to generate the SNR distribution data by performing a low pass filter to the processing target data.

3. A data processing apparatus of claim 1,
wherein said weighting function generating function is configured to generate the weighting function by performing a linear transformation to the SNR distribution data.

4. A data processing apparatus of claim 1,
wherein said weighting function generating function is configured to generate the weighting function by performing a nonlinear transformation to the SNR distribution data.

5. A data processing apparatus of claim 1,
wherein said SNR distribution data generating function is configured to use projection data having a noise as the processing target data.

6. A data processing apparatus of claim 1,
wherein said SNR distribution data generating function is configured to use image data having a noise as the processing target data.

7. A data processing apparatus of claim 1,
wherein said SNR distribution data generating function is configured to use projection data acquired by at least one of: (a) a computed tomography apparatus, (b) a magnetic resonance imaging apparatus, (c) a positron emission computed tomography apparatus, and (d) a single photon emission computed tomography apparatus as the processing target data.

8. A data processing apparatus of claim 1,
wherein said corrected data generating function is configured to generate the corrected data with an edge enhancement correction to the processing target data.

9. A data processing apparatus of claim 1,
wherein said SNR distribution data generating function is configured to generate the SNR distribution data based on the processing target data which is data acquired by using plural coils having sensitivity distributions included in a magnetic resonance imaging apparatus as sensors.

10. A data processing apparatus of claim 1, wherein said at least one data processor is further configured to provide:
a transforming function configured to transform the processing target data so as to obtain a positive correlation relationship between a signal intensity and the SNR of the processing target data when a nonlinear or negative correlation relationship exists between the signal intensity and the SNR.

11. A data processing apparatus of claim 1,
wherein said filter processing function is configured to perform the filter processing with using an LSI filter, a structure adaptive filter or a Wiener Filter.

12. A data processing apparatus of claim 1,
wherein said filter processing function is configured to perform the filter processing using a filter having a filter strength determined based on only the processing target data or based on an absolute SNR of the processing target data serving as an index.

13. A data processing apparatus of claim 1,
wherein said SNR distribution data generating function is configured to respectively generate plural sets of SNR distribution data based on plural sets of processing target data acquired by plural sensors,
said filter processing function is configured to respectively generate plural sets of filter processed data by performing filter processing to the plural sets of the processing target data,
said weighting function generating function is configured to respectively generate plural weighting functions based on the plural sets of the SNR distribution data, and
said corrected data generating is configured to respectively generate plural sets of corrected data by performing weighted calculation between the plural sets of the processing target data and the plural sets of the filter processed data using the plural weighting functions,
said at least one data processor being further configured to provide a combining function configured to combine the plural sets of the corrected data.

14. A data processing apparatus of claim 1,
wherein said SNR distribution data generating function is configured to generate the SNR distribution data by performing a nonlinear transformation to the processing target data having a nonlinear correlation relationship with the SNR showing a peak, the nonlinear transformation depending on the nonlinear correlation relationship.

15. A data processing apparatus as in claim 1, wherein said at least one data processor is further configured to provide:
a window transformation function which applies a window transformation to said corrected data based on said windowing information.

16. A data processing apparatus comprising at least one data processor configured to provide:
a signal to noise (SNR) distribution data generating function which generates SNR distribution data of processing target data;
a filter processing function which generates filter processed data obtained by performing filter processing on the processing target data to improve a SNR of the processing target data based on windowing information to be used in a subsequent window transformation;
a weighting function generating function which generates a weighting function based on the SNR distribution data; and
a corrected data generates function which generates corrected data by performing weighted calculation between the processing target data and the filter processed data using the weighting function,
wherein said weighting function generating function is configured to generate the weighting function wherein weighting becomes a maximum in case of a signal intensity of the SNR distribution data being a window level±window width/2 and a minimum in case of the signal intensity being equivalent to the window level.

17. A medical diagnostic apparatus comprising at least one data processor configured to provide:
a data acquisition function which acquires processing target data from an object;
a SNR distribution data generating function which generates SNR distribution data of the processing target data based on the processing target data;
a filter processing function which generates filter processed data obtained by performing filter processing on the processing target data to improve a SNR of the processing target data;
a weighting function generating function which generates a weighting function based on the SNR distribution data and based on windowing information to be used in a subsequent window transformation; and
a corrected data generating function which generates corrected data by performing weighted calculation between the processing target data and the filter processed data using the weighting function, wherein said at least one data processor if further configured to provide:

a setting function configure automatically set at least one of a window width a window level and a gamma curve as the information used for the window transformation synchronously based on an operation of an input device, as a preset value or according to a predetermined condition; and a display function configured to display data generated based on the corrected data when the information used for the window transformation is synchronously set based on the operation of the input device.

18. A medical diagnostic apparatus of claim 17, wherein said data acquisition function is configured to acquire raw data as the processing target data.

19. A medical diagnostic apparatus of claim 17, wherein said data acquisition function is configured to acquire image data as the processing target data.

20. A medical diagnostic apparatus of claim 17, wherein said data acquisition function is configured to acquire time axis data as the processing target data.

21. A data processing method comprising at least one data processor to:

generate SNR distribution data of processing target data based on the processing target data;

generate filter processed data obtained by performing filter processing to the processing target data to improve a SNR of the processing target data;

generate a weighting function based on the SNR distribution data and based on windowing information to be used in a subsequent window transformation; and generate corrected data by performing weighted calculation between the processing target data and the filter processed data using the weighting function, wherein said at least one data processor is further configured to provide:

a setting function configured to automatically set at least one of a window width, a window level and gamma curve as the information used for the window transformation synchronously based on an operation of an input device, as a preset value or according to a predetermined condition; and a display function configured to display data generated based on the corrected data when the information used for the window transformation is synchronously set based on the operation of the input device.

22. A medical diagnostic method comprising using at least one data processor to:

acquire processing target data from an object;

generate SNR distribution data of the processing target data based on the processing target data;

generate filter processed data obtained by performing filter processing on the processing target data to improve a SNR of the processing target data;

generate a weighting function based on the SNR distribution data; and generate corrected data by performing weighted calculation between the processing target data and the filter processed data using the weighting function, wherein said at least one data processor is further configured to provide:

a setting function configured to automatically set at least one of a window width, a window level and a gamma curve as the information used for the window transformation synchronously based on an operation of an input device, as a preset value or according to a predetermined condition; and a display function configured to display data generated based on the corrected data when the information used for the window transformation is synchronously set based on the operation of the input device.

23. A medical diagnostic method of claim 22, wherein raw data is acquired as the processing target data.

24. A medical diagnostic method of claim 22, wherein image data is acquired as the processing target data.

* * * * *